United States Patent
Cheng et al.

(10) Patent No.: US 12,056,422 B1
(45) Date of Patent: Aug. 6, 2024

(54) SYSTEM FOR DESIGNING PERFORATING GUN CAPABLE OF REDUCING ENERGY CONSUMPTION

(71) Applicants: DEPARTMENT OF NATIONAL DEVELOPMENT AND REFORM COMMISSION AND REGIONAL ECONOMICS, Beijing (CN); CHENGDU UNIVERSITY OF TECHNOLOGY, Sichuan (CN); DEPARTMENT OF CIVIL AND ENVIRONMENTAL ENGINEERING, UNIVERSITY OF PITTSBURGH, Pittsburgh, PA (US); ADMINISTRATIVE COMMISSION OF BEIJING CITY SUB-CENTER, Beijing (CN); BEIJING HUIDAFENG TECHNOLOGY CO., LTD., Beijing (CN)

(72) Inventors: Cheng Cheng, Chengdu (CN); Chuanqi Yu, Beijing (CN); Andrew Bunger, Pittsburgh, PA (US)

(73) Assignees: DEPARTMENT OF NATIONAL DEVELOPMENT AND REFORM COMMISSION AND REGIONAL ECONOMICS, Beijing (CN); CHENGDU UNIVERSITY OF TECHNOLOGY, Chengdu (CN); DEPARTMENT OF CIVIL AND ENVIRONMENTAL ENGINEERING, UNIVERSITY OF PITTSBURGH, Pittsburgh, PA (US); ADMINISTRATIVE COMMISSION OF BEIJING CITY SUB-CENTER, Beijing (CN); BEIJING HUIDAFENG TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/437,262

(22) Filed: Feb. 9, 2024

(30) Foreign Application Priority Data

Aug. 9, 2023 (CN) .................. 202310998835.X

(51) Int. Cl.
*G06F 30/17* (2020.01)
*E21B 49/00* (2006.01)
*E21B 43/116* (2006.01)

(52) U.S. Cl.
CPC .............. *G06F 30/17* (2020.01); *E21B 49/00* (2013.01); *E21B 43/116* (2013.01); *E21B 2200/20* (2020.05)

(58) Field of Classification Search
CPC .... E21B 49/00; E21B 2200/20; E21B 43/116; G06F 30/17
See application file for complete search history.

(56) References Cited

U.S. PATENT DOCUMENTS 9,442,205 B2 * 9/2016 Geiser .................. G01V 1/308
9,618,652 B2 * 4/2017 Weng .................... G01V 20/00
(Continued)

FOREIGN PATENT DOCUMENTS

CN   108952677 A   12/2018
CN   109992864 A   7/2019
(Continued)

OTHER PUBLICATIONS

First Office Action in Chinese Application No. 202310998835.X mailed on Sep. 20, 2023, 12 pages.
(Continued)

*Primary Examiner* — Yong-Suk (Philip) Ro
(74) *Attorney, Agent, or Firm* — Porus IP LLC

(57) ABSTRACT

System for designing a perforating gun capable of reducing energy consumption includes a survey module, an operation module, a monitoring module, a storage module, and a (Continued)

computing module. The operation module is configured to match a target perforating gun to perform a perforating operation to perform an HF operation, obtain a status parameter when the target perforating gun performs the perforating operation and send the status parameter to the monitoring module. The survey module is configured to obtain basic data of a target operation region. The monitoring module is configured to, at a preset frequency, obtain a safety monitoring result by analyzing first data in target data and the status parameter; in response to the safety monitoring result not satisfying a preset safety condition, control a fracturing control pump of the operation module to stop operation; and obtain an HF effect by analyzing second data, in response to the HF effect not satisfying a preset effect condition, update the preset frequency.

9 Claims, 15 Drawing Sheets

(56) References Cited

U.S. PATENT DOCUMENTS

| | | | | |
|---|---|---|---|---|
| 10,422,208 | B2* | 9/2019 | Weng | E21B 43/267 |
| 10,544,667 | B2* | 1/2020 | Wu | E21B 43/267 |
| 10,677,961 | B1* | 6/2020 | Chen | E21B 43/26 |
| 2004/0220846 | A1 | 11/2004 | Cullick et al. | |
| 2006/0155473 | A1* | 7/2006 | Soliman | E21B 49/00 |
| | | | | 702/12 |
| 2017/0114613 | A1* | 4/2017 | Lecerf | E21B 43/26 |
| 2019/0112909 | A1* | 4/2019 | Zeng | E21B 43/26 |
| 2019/0292884 | A1* | 9/2019 | McClure | G01V 1/306 |
| 2023/0175359 | A1* | 6/2023 | Xia | E21B 43/119 |
| | | | | 166/297 |

FOREIGN PATENT DOCUMENTS

| | | |
|---|---|---|
| CN | 113685164 A | 11/2021 |
| CN | 113850029 A | 12/2021 |
| CN | 116401897 A | 7/2023 |

OTHER PUBLICATIONS

Notification to Grant Patent Right for Invention in Chinese Application No. 202310998835.X mailed on Sep. 26, 2023, 5 pages.

Tang, Yang et al., Development and Laboratory Experiments of Pressure-Controlled Sliding Sleeves for Injection and Crushing Operations in The Exploitation of Deep Sea Shallow Non Diagenetic Marine Gas Hydrates, Natural Gas Industry, 40(8): 186-194, 2020.

Li, Xiaogang et al., Numerical Simulation of Hydraulic Fractures Propagation in Multiple Thin Coal Seams, Journal of China Coal Society, 43(6): 1669-1676, 2018.

Wu, Jianjun et al., Application of Sector Hydraulic Sand Blasting Directional Perforation Fracturing Technology in Coalbed Methane Wells, Drilling & Production Technology, 41(4), 2018, 5 pages.

* cited by examiner (a)

(b)

(a)

(b)

(a)

(b)

SYSTEM FOR DESIGNING PERFORATING GUN CAPABLE OF REDUCING ENERGY CONSUMPTION

CROSS-REFERENCE TO RELATED APPLICATION

This application claims priority to Chinese application No. 202310998835.X, filed Aug. 9, 2023, the entire content of which is incorporated herein by reference.

TECHNICAL FIELD

The present disclosure relates to the technical field of stress-coupled perforating gun design, and in particular to a system for designing a perforating gun capable of reducing energy consumption.

BACKGROUND

Hydraulic fracturing (HF) plays an increasingly important role in energy production of oil and gas (hydrocarbon) resources. A horizontal well fracturing may be performed in stages, with the intention to deliver fracturing fluids from three to six perforation clusters simultaneously into a reservoir through casings to create cracks, and then use a proppant to keep the cracks from closing, so that the oil and gas may flow out of the cracks to the earth surface under a formation pressure. However, 20%-40% of perforation clusters may be commonly observed to be of not contribute to production (Miller et al., 2011). One factor contributing to a heterogeneity of the production from these perforation clusters may be the heterogeneity of in-situ stresses along the wells and the heterogeneity of the physical and mechanical properties of the reservoirs (e.g., Baihly et al., 2010; Cipolla et al. 2011). Another factor may be "stress masking", which refers to a suppression of some HF due to compressive stresses applied by nearby HF (e.g. Abbas et al. 2009; Fisher et al. 2004; Meyer & Bazan 2011; Sesetty & Ghassemi 2013). Considering that a production capacity is positively correlated with a crack area, this uneven crack extension may not be conducive to a full utilization of injected fluids, which leads to a reduction in the crack area for the same amount of injected fluids, and thus reduce the production capacity.

With an increasing prominence of fracturing in oil and gas production, a need to reduce negative impacts of a reservoir inhomogeneity may become increasingly urgent. Considering that the perforating gun is an indispensable device in a process of HF, and at the same time, an optimization of the perforating gun may be highly operable among the many solutions, it may be worthwhile to study an improvement mode thereof in depth. The perforating gun may be an essential piece of equipment used in the HF process and may usually be made of a long, thin steel tube containing a series of explosive substances used to create holes inside a well bore. In the hydraulic fracturing process, a perforating gun may be used to create small holes on the walls of the well bore, which allows water or other fracturing fluids to flow into the oil and gas reservoirs and create additional crack.

In recent years, an ultimate flow-limiting perforating gun has been used on a large scale, based on a principle of dominating an overall pressure by creating fewer or smaller perforating holes in each completed hole along each completed well cluster, in order to control the crack extension through a pressure reduction. However, this reduction of uncertainty may also bring a cost of requiring a significantly increased pumping power to maintain an increased pumping pressure and to maintain a sufficient injection rate for as long as economically and operationally feasible to allow the crack to expand. In addition, as there are not only economic but also environmental and social costs associated with each well, it may be equally important to ensure an optimal recovery to maximize return on investment.

Therefore, it is desired to propose an optimized and reliable system for designing a perforating gun capable of reducing an energy consumption with a simple logic.

SUMMARY

One or more embodiments of the present disclosure provide a system for designing a perforating gun capable of reducing an energy consumption, including: a survey module, an operation module, a monitoring module, a storage module, and a computing module. The survey module, the operation module, the monitoring module, the storage module, and the computing module may be communicatively connected to each other. The operation module may be configured to perform a hydraulic fracturing (HF) operation, receive a control instruction from the computing module and the monitoring module, and feedback a status parameter to the monitoring module, including: receiving a first control instruction sent by the computing module and executing the first control instruction. The first control instruction may be used to control the operation module to match a target perforating gun to perform a perforating operation, the target perforating gun being a perforating gun satisfying a target perforation parameter combination. The target perforation parameter combination including a perforation number and a perforation diameter of a perforation cluster. The operation module may be configured to perform a hydraulic fracturing (HF) operation, receive a control instruction from the computing module and the monitoring module, and feedback a status parameter to the monitoring module further including receiving and executing a second control instruction sent by the monitoring module, the second control instruction being configured to control a fracturing control pump of the operation module to stop operation; and obtaining a status parameter of the target perforating gun when performing the perforating operation and sending the status parameter to the monitoring module, the status parameter including at least a temperature, and a pressure. The survey module may be configured to: before the fracturing operation, obtain initial basic data of a target operation region and send the initial basic data to the storage module, the initial basic data at least including: a geological parameter and an engineering parameter of a geological region in which a stress-coupled perforating gun is employed; and in the fracturing operation, in response to a completion of the fracturing operation for each individual well, re-obtain the basic data for the target operation region, and obtain updated basic data and send the basic data to the monitoring module. At a preset frequency, the monitoring module may be configured to: obtain target data from one or more sensors deployed in the target operation region, and send the target data to the storage module, the target data including first data and second data, the first data including at least one operation safety indicator, the second data including at least one fracturing effect detection indicator; obtain a safety monitoring result by analyzing the first data, and the status parameter sent by the operation module. In response to the safety monitoring result not satisfying a preset safety condition, the monitoring module may generate the second control instruction, and send the second control instruction to the operation module;

and obtain a hydraulic fracturing effect by analyzing the second data. In response to the hydraulic fracturing effect not satisfying a preset effect condition, the monitoring module may update the preset frequency, the updated preset frequency being determined based on a difference between the updated basic data obtained by the survey module and the initial basic data.

In some embodiments, the computing module may be configured to: in S1, recall the initial basic data of the target operation region from the storage module, and construct a perforating gun stress coupling model based on the basic data of the target operation region; in S2, select the perforation number of the perforation cluster and a perforation diameter by Monte Carlo randomization, and form an array trial calculation perforation parameter pair; in S3, establish an initial iterative flow equation based on the perforating gun stress coupling model, and perform a crack expansion pattern calculation to obtain a crack development pattern; in S4, obtain a real-time stress distribution state by stress calculation formula (14) based on the crack development pattern; in S5, calculate a power consumed by the crack to overcome the stress effect of a fractured crack; at the same time, calculate a power loss when the fluid passes through the perforation hole of the perforation based on a trial calculation perforation parameter; in S6, obtain an instantaneous flow for each perforation cluster for the iteration by performing a power balance equation settlement in Newton's method and return to S3; in S7, repeat S3 to S6 until the instantaneous flow for each perforation cluster is less than a preset threshold, and proceed to S8; in S8, obtain a total pumping time T required for the flow of each perforation cluster to be less than the preset threshold, and accumulate to obtain a combined crack area in an individual segment; in S9, repeat S3 to S8 until the crack development patterns of all segments of an individual well and a corresponding total energy consumption are obtained, and obtain the energy consumed on a per unit fracturing area for a trial calculation perforation parameter pair; and S10, traverse any trial calculation perforation parameter pair, select a perforation parameter combination that achieves the maximum fracture fracturing area with the minimum energy consumption as a target perforation parameter combination, generate the first control instruction and send the first control instruction to the operation module to complete an optimization of the stress-coupled perforating gun.

Compared with the existing technology, the present disclosure has the following beneficial effects:

(1) The present disclosure designs the corresponding perforating gun through a distribution of a ground stress, and optimizes the perforation parameter by the pumping energy consumed per unit area of the crack, and obtains a stress-coupled perforating gun, which reduces the pumping power, and reduces the energy consumption and a corresponding carbon emission.

(2) The present disclosure mainly considers: the perforation number and the perforation diameter of the perforation cluster, and therefore for the high energy consumption problem prevailing in the fracturing process nowadays, for the improvement of the perforating gun, which is actually the improvement of the perforating gun in terms of the perforation number and the perforation diameter of the perforation cluster. But due to a computing speed of most of the existing simulation software, the optimization of fracturing design parameter may always be based on an uncoupled manner, which allows only one parameter to be a variable, and the others to be optimized may be set as fixed values. When one parameter is optimized, it may be fixed, and then the other parameters may be optimized one by one. However, in actual crack extension processes, a plurality of parameters may interfere with each other, and the use of uncoupled optimization may inevitably fail to achieve the expected optimization effect.

(3) The present disclosure uses a Monte Carlo randomization method to randomly assign values to the perforation parameter to form random parameter pairs for importing into the model, so as to obtain a plurality of test-calculated perforation parameter pairs for following evaluation comparison.

(4) The present disclosure employs Newton's method to find a root of the equation, and a general idea of the stress-coupled perforating gun may be to balance a stress extrusion generated by the crack expansion by manipulating both a perforation hole number and their diameters, so as to avoid that some crack are suppressed from developing, while only a few cracks develop.

BRIEF DESCRIPTION OF THE DRAWINGS

The present disclosure is further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
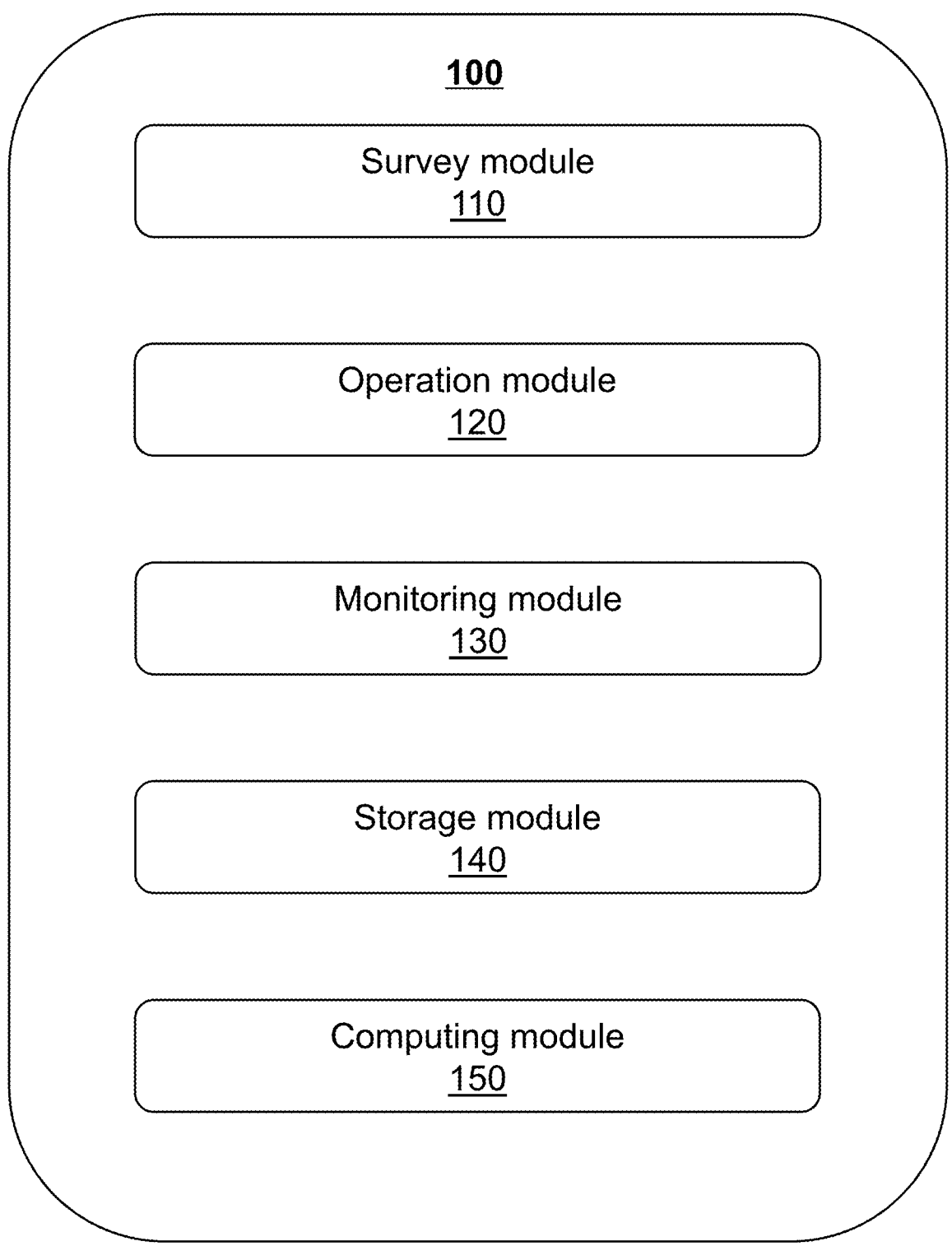
FIG. 1 is a schematic diagram illustrating modules of a system for designing a perforating gun capable of reducing energy consumption according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios in accordance with these drawings without creative labor. The present disclosure may be applied to other similar scenarios based on these drawings without creative labor. Unless obviously obtained from the context or the context illustrates otherwise, the same numeral in the drawings refers to the same structure or operation.

It should be understood that the terms "system", "device", "unit" and/or "module" as used herein is a way to distinguish between different components, elements, parts, segments, or assemblies at different levels. However, the words may be replaced by other expressions if other words accomplish the same purpose.

As shown in the present disclosure and the claims, unless the context clearly suggests an exception, the words "one", "a", "an", and/or "the" do not refer specifically to the singular, but may also include the plural. Generally, the terms "including" and "comprising" suggest only the inclusion of clearly identified operations and elements. In general, the terms "including" and "comprising" only suggest the inclusion of explicitly identified operations and elements that do not constitute an exclusive list, and the method or apparatus may also include other operations or elements.

Flowcharts are used in the present disclosure to illustrate operation performed by a system according to embodiments of the present disclosure. It should be appreciated that the preceding or following operation are not necessarily performed in an exact sequence. Instead, operations may be processed in reverse order or simultaneously. Also, it is possible to add other operation to these processes or remove an operation or operations from them.

FIG. 1 is a schematic diagram illustrating modules of a system for designing a perforating gun capable of reducing energy consumption according to some embodiments of the present disclosure.

As shown in FIG. 1, a system for designing a perforating gun 100 may include a survey module 110, an operation module 120, a monitoring module 130, a storage module 140, and a computing module 150.

The survey module 110 may be configured as a functional module for obtaining related information of a target operation region. The target operation region refers to an operation region where a stress-coupled perforating gun is utilized to perform a perforating operation. Basic data refers to data related to a hole perforating operation performed by the stress-coupled perforating gun. In some embodiments, the basic data may include a geological parameter, and an engineering parameter of a geologic region in which the stress-coupled perforating gun is employed. The geological parameter may include a reservoir parameter and an in-situ stress distribution. The engineering parameter may be a parameter related to a fracturing operation. In some embodiments, the engineering parameter may include segment, clustering, and pump injection program definition input parameters. Further descriptions of the reservoir parameter, the in-situ stress distribution, the segment, clustering, and pump injection program definition input parameter may be found elsewhere in the present disclosure.

In some embodiments, the survey module 110 may be configured to: before the fracturing operation, obtain initial basic data of the target operation region and send the initial basic data to the storage module 140. In the fracturing operation, in response to a completion of the fracturing operation for each individual well, the survey module 110 may be configured to re-obtain the basic data for the target operation region, obtain updated basic data, and send the basic data to the monitoring module 130.

Operation module 120 may be configured as a functional module for performing a hydraulic fracturing (HF) operation. In some embodiments, the operation module 120 may include devices such as a casing, a perforating gun, a fracturing control pump, etc.

In some embodiments, the operation module 120 may be configured to perform an HF operation, receive a control instruction from the computing module 150 and the monitoring module 130, and feedback a status parameter to the monitoring module 130. In some embodiments, the operation module 120 may be used to receive a first control instruction sent by the computing module 150 and execute the first control instruction. The first control instruction may be used to control the operation module 120 to match a target perforating gun to perform the perforating operation, the target perforating gun being a perforating gun satisfying a target perforation parameter combination. The target perforation parameter combination refers to a setup parameter when the stress-coupled perforating gun performs the perforating operation. The perforation parameter combination may include a perforation number of the perforation cluster, and a diameter of the perforation diameter.

In some embodiments, the operation module 120 may be used to receive a second control instruction sent by the monitoring module 1309 and execute the second control instruction. The second control instruction may be used to control the fracturing control pump of the operation module 120 to stop operation. The fracturing control pump may be configured to provide a pressure to, for example, a target perforating gun.

In some embodiments, the operation module 120 may be used to obtain a status parameter when the target perforating gun performs a perforating operation and send the status parameter to the monitoring module 130. In some embodiments, the status parameter may at least include a temperature, and the pressure.

In some embodiments, the status parameter may also include an operation start time, an operation duration, an operation status, an operation power, etc. of the operation module 120. The status parameter may include a status parameter of a particular device in the operation module 120, or may include status parameters of a plurality of devices in the operation module 120.

In some embodiments, the operation module 120 may include one or more sensors through which corresponding status parameters are obtained. Exemplarily, a plurality of power meters, depth meters, thermometers, manometers, etc. may be mounted on the target perforating gun to obtain the corresponding status parameter.

The monitoring module 130 may be configured as a functional module for monitoring the information related to the fracturing operation in the target operation region. In some embodiments, the monitoring module 130 may preset a frequency and receive the status parameter sent from the operation module 120, and target data sent from one or more sensors in the target operation region, and perform analysis and processing.

In some embodiments, the monitoring module 130 may be configured to perform, at a preset frequency, a task of: obtaining the target data from the one or more sensors deployed in the target operation region and sending the target data to the storage module 140 for storage.

The target data may be configured as data reflecting information related to an environment, a climate, a soil, a geology, a construction operation, etc. of the target operation region. In some embodiments, the target data may include first data and second data.

The first data may be configured as relevant data that reflects a current operation safety situation. In some embodiments, the first data may include at least one operation safety indicator. In some embodiments, the operation safety indicator may include a chemical composition content of groundwater, a seismic intensity of the target operation region, etc.

The monitoring module 130 may obtain the first data in a variety of ways. Exemplarily, the monitoring module 130 may obtain the first data through one or more sensors deployed in the target operation region. For example, obtain the chemical composition content of the groundwater through an environmental analyzer, and obtain the seismic intensity through a seismometer, etc.

In some embodiments, the monitoring module 130 may obtain a safety monitoring result by analyzing the first data, and a status parameter sent by the operation module. In response to the safety monitoring result not satisfying a preset safety condition, the monitoring module 130 may generate the second control instruction, and send the second control instruction to the operation module.

The safety monitoring result refers to a test result reflecting whether or not a personal safety of construction personnel and a property safety of the construction device, etc. are currently at risk. In some embodiments, the safety monitoring result may include an environmental pollution risk degree and a seismic risk degree, etc.

The environmental pollution risk degree refers to an extent of impact on the health condition of the construction personnel and the construction device by the environmental pollution in the target operation region. The greater the environmental pollution risk degree, the more serious the environmental pollution, the more the construction personnel and construction device in the target operation region may be affected.

The seismic risk degree refers to a likelihood of an earthquake occurring in the target operation region and an extent of damage to the construction personnel and device in the earthquake. The greater the seismic risk degree, the greater the likelihood of the earthquake, and the more severe the damage caused by the earthquake.

In some embodiments, the monitoring module 130 may obtain the safety monitoring result based on whether the first data exceeds a corresponding threshold.

In some embodiments, the monitoring module 130 may determine first exceedance amounts of a plurality of chemical composition contents that exceeds a corresponding content threshold; and based on the first exceedance amounts of the plurality of chemical composition contents, weight the first exceedance amounts to determine the environmental pollution risk degree. The content thresholds corresponding to different chemical composition contents may be determined based on historical data or prior knowledge. The weights corresponding to the first exceedance amounts of the different chemical composition contents may be predetermined by a system or by human.

In some embodiments, the monitoring module 130 may check a risk degree comparison table to determine the seismic risk degree based on the seismic intensity and the status parameter. The risk degree comparison table may include correspondences between different seismic intensity, different status parameter, and different seismic risk degree. The risk degree comparison table may be determined based on the historical data or the prior knowledge.

In some embodiments, the monitoring module 130 may obtain an HF effect by analyzing the second data. In response to the HF effect not satisfying a preset effect condition, the monitoring module 130 may update the preset frequency.

The second data may be configured to reflect data related to an effectiveness of the fracturing operation. In some embodiments, the second data may include at least one fracturing effect detection indicator. In some embodiments, the fracturing effect detection indicator may include a length, a radius, and an area of a crack generated by fracturing, as well as a pressure, a flow rate, etc. of the perforation cluster.

The monitoring module 130 may obtain the second data in a manner similar to the manner in which it obtains the first data, which is referred to in the above contents related to the first data.

The HF effect may be a degree of compliance of an actual effect of HF with a desired fracturing effect. The HF effect may be expressed by a grade or a numerical value, e.g., the greater the numerical value, the better the actual effect of the current HF, and the more the actual effect of the current HF conforms to the fracturing result in an ideal case.

In some embodiments, the monitoring module 130 may determine statistical data for a plurality of fracturing cracks, and based on a plurality of statistical data and corresponding statistical thresholds, the monitoring module 130 may determine the HF effect. In some embodiments, the statistical data may include, but not limited to, one or more of an average length, an average area, a maximum length difference, a maximum area difference, etc. The maximum length difference refers to the maximum value of the length difference between each two cracks of the plurality of fracturing crack. The maximum area difference refers to the maximum value of the area difference of each two cracks in the plurality of fracturing cracks. The monitoring module 130 may statistically analyze the plurality of fracturing cracks based on the lengths, areas, length differences, and area differences of the plurality of fracturing cracks to obtain the statistical data.

In some embodiments, the monitoring module 130 may determine a second exceedance amount of the plurality of statistical data exceeding the corresponding statistical threshold; and based on the second exceedance amounts of the plurality of statistical data, the monitoring module 130 may weight the second exceedance amounts to determine the HF effect. The statistical threshold corresponding to different statistical data may be determined based on historical data or prior knowledge. The weights corresponding to the second exceedance amount of the different statistical data may be preset by the system or by a human.

For example, the HF effect may be determined by the following Eq. (1):

$$W = a \times (\check{L} - L) + b \times (\check{S} - S) + c \times (\check{X} - X) + d \times (\check{Y} - Y) \tag{1}$$

where, W denotes the HF effect; $\check{L}$ denotes the average length of the plurality of the fracturing crack; L denotes the length threshold of the plurality of fracturing crack; $\check{S}$ denotes the average area of the plurality of fracturing crack; S denotes the area threshold of the plurality of fracturing crack; $\check{X}$ denotes a length difference threshold of the plurality of fracturing crack; X denotes the maximum length difference of the plurality of fracturing crack; $\check{Y}$ denotes an area difference threshold of the plurality of fracturing crack; Y denotes the maximum area difference of the plurality of fracturing crack; a,b,c,d denote the preset weights. The length threshold and the area threshold may represent the minimum crack length and area to be achieved for the fracturing effect to be qualified, and a failure to do so may be considered to be an undesirable effect (resulting in lower production capacity) of the fracturing. The length difference threshold and the area difference threshold represent the maximum length and area difference that is acceptable for the fracturing, and when the length difference threshold and the area difference threshold are exceeded, it indicates an uneven distribution of the fracturing effect (a uniformly distributed crack makes for a higher utilization of the fracturing fluid). The length threshold, the area threshold, the maximum length difference, the maximum area difference, and the weights may be set based on the prior experience.

In some embodiments, the monitoring module 130 may update the preset frequency in response to the HF effect not meeting the preset effect condition.

In some embodiments, the preset effect condition may include the HF effect exceeding a fracturing effect threshold. In some embodiments, when the HF effect does not exceed the fracturing effect threshold, the current HF effect may be considered to be unqualified, and when the HF effect exceeds the fracturing effect threshold, the current HF effect may be considered to be qualified. The fracturing effect threshold may be determined based on historical data and/or the priori experience.

The preset frequency refers to a frequency at which the monitoring module 130 obtains the target data. In some embodiments, the monitoring module 130 may determine the updated preset frequency based on a similarity between the updated basic data and the initial basic data. The embodiments of the present disclosure do not have a particular limitation on the manner of calculating the similarity, and any operation known to those skilled in the art may be adopted. In some embodiments, the monitoring module 130 may determine the updated preset frequency by checking a frequency cross-reference table based on the similarity between the initial basic data and the updated basic data. In some embodiments, the frequency comparison table may include a correspondence between the similarity of different initial basic data as well as the updated basic data, and different preset frequencies. The frequency comparison table may be pre-constructed based on the historical data or the prior knowledge.

In some embodiments, the monitoring module 130 may generate, in response to that the HF effect does not satisfy the preset effect condition in a preset consecutive times, a third control instruction and send the third control instruction to the computing module 150 for execution. In some embodiments, the third control instruction may be used to control the computing module 150 to reconstruct a perforating gun stress coupling model based on the updated basic data of the target operation region. The preset consecutive times may be determined by system or human preset.

The storage module 140 may be configured as a functional module for storing relevant information received. The storage module may perform data transmissions with other modules. The storage module 140 may include one or more storage components, each of which may be a stand-alone device or may be part of other devices. In some embodiments, the storage device 130 may include a random access memory (RAM), a read-only memory (ROM), a mass storage, a removable memory, a volatile read/write memory, etc., or any combinations thereof. Exemplarily, the mass storage may include a disk, an optical disk, a solid state disk, etc. In some embodiments, the storage device 130 may be implemented on a cloud platform.

The computing module 150 may be configured as a functional module that performs analytical operation processing of various data. In some embodiments, the computing module 150 may include a processor. The processor may execute program instructions based on data, information, and/or processing results to perform one or more of the functions described in the present disclosure. In some embodiments, the processor may include one or more sub-processing devices (e.g., an individual-core processing device or a multi-core processing device). Merely way of example, the processor may include a central processing unit (CPU), an application-specific integrated circuit (ASIC), an application-specific instruction processor (ASIP), a graphics processor (GPU), a physical processor (PPU), a digital signal processor (DSP), a field programmable gate array (FPGA), a programmable logic circuit (PLD), a controller, microcontroller unit, a reduced instruction set computer (RISC), a microprocessor, etc., or any combination thereof.

A conventional flow-limiting perforating gun may promote a uniform fluid distribution by reducing the perforation diameter in a wellbore casing and by reducing a perforation hole number, so that a pressure intensity through the perforations may be greater than a pressure of an HF extension. However, in actual field construction, extreme flow limiting techniques may be extensively employed to ensure the uniformity of a crack propagation, at this time, a perforation pressure intensity may be several times the intensity of the fracturing pressure. This may also bring a cost of requiring a significantly increased pumping power to maintain an increased pumping pressure, which significantly increases an energy consumption and a carbon emission. This happens because a crack expansion law under a dynamic distribution of stress is not handled in the field construction process, and the flow limiting technology is misused. Therefore, the present embodiment firstly introduces how to quickly calculate to obtain the dynamically changing stress distribution in the fracturing process, and to obtain a crack development pattern based on the stress distribution, and then to randomly combine the perforation parameter by Monte Carlo randomization. Taking the energy consumed per unit crack area as an optimization indicator, the perforation parameter may be selected to obtain the design parameter of the stress-coupled perforating gun.

Part I, Stress Distribution Calculation Process

The embodiment is based on a full-coupling optimization of the perforation hole number and the perforation hole diameter, and the optimization of the two parameter is based on an accurate prediction of the stress distribution, considering that a segmental fracturing is a dynamic process, and the stresses within a stratum of the operating wells may also change dynamically, therefore, the optimization process of this embodiment may be as follows:

First, the crack corresponding to each perforation cluster may be denoted by $F_{i,j,k}$, i.e., the kth crack within the jth segment of the ith well. After labeling each crack, the stress at any position in space may be obtained by an elastic stress equation. Any point C in the reservoir may have a horizontal coordinate x, a vertical coordinate y, and a height coordinate z. A magnitude of the stress at point C in space due to a deformation of the crack $F_{i,j,k}$ may be calculated.

It is known that a spatial position of the perforation cluster corresponding to crack $F_{i,j,k}$ may be point A ($x-x_{i,j,k}$, $y-y_{i,j,k}$, $z-z_{i,j,k}$), and the spatial location of the perforation cluster corresponding to crack $F_{i,j,k}$ is point B ($x_{i,j,k+1}$, $y_{i,j,k+1}$, $z_{i,j,k+1}$), and the following vectors may be obtained:

$$\vec{AC} = (x - x_{i,j,k}, y - y_{i,j,k}, z - z_{i,j,k}) \quad (1)$$

$$\vec{AB} = (x_{i,j,k-1} - x_{i,j,k}, y_{i,j,k-1} - y_{i,j,k}, z_{i,j,k-1} - z_{i,j,k}) \quad (2)$$

A length of the projection of vector $\vec{AC}$ on vector $\vec{AB}$ = ($\vec{AC} \cdot \vec{AB}$)/|$\vec{AB}$|, where, $\vec{AB}$ denotes a modulus length of the vector $\vec{AB}$, i.e., a length from point A to point B. The present embodiment may then use the collinear theorem to obtain a perpendicular distance from point C to the surface perpendicular to the line AB over the point A, i.e.

$$D_{C,(i,j,k)} = \sqrt{|\vec{AB}|^2 - \left[(\vec{AC} \cdot \vec{AB})/|\vec{AB}|\right]^2} \quad (3)$$

where, $\vec{AC}$ denotes the modulus length of the vector $\vec{AC}$, which is a distance from point C to point A. The present embodiment may obtain a perpendicular distance DC from any point C in space to a surface perpendicular to a well trajectory of the perforation cluster($x_{i,j,k}$, $y_{i,j,k}$, $z_{i,j,k}$). The distance from the projection point of an arbitrary point C in space on the crack surface to point A ($x_{i,j,k}$, $y_{i,j,k}$, $z_{i,j,k}$), which corresponds to the position of the perforation cluster, is:

$$L_{C,(i,j,k)} = \sqrt{|\vec{AC}|^2 - [D_{C,(i,j,k)}]^2} \quad (4)$$

Note:

$$\zeta_{C,(i,j,k)} = \frac{D_{C,(i,j,k)}}{R_{i,j,k}}, \; \rho_{C,(i,j,k)} = \frac{L_{C,(i,j,k)}}{R_{i,j,k}} \quad (5)$$

where, $\zeta_{c,(i,j,k)}$ denotes a ratio of a projected perpendicular distance $D_{(i,j,k)}$ between any point C in the space and the fracture surface of the kth crack $F_{i,j,k}$ in the jth segment of the ith well to a radius $R_{i,j,k}$ of the crack. As the crack expands, i.e., $R_{i,j,k}$ increases, the value of $\zeta_{c,(i,j,k)}$ decreases. $\rho_{c,(i,j,k)}$ denotes a ratio of the distance $L_{c,(i,j,k)}$ between any point C in space on the fracture surface in the direction of the crack extension and a center of the kth crack $F_{i,j,k}$ in the jth segment of the ith well to the crack radius $R_{i,j,k}$ A normal stress component applied by the crack $F_{i,j,k}$ to any point C in the space may be approximated as follows.

$$\sigma_{C,(i,j,k)} = \frac{2 P_{i,j,k}}{\pi} \quad (6)$$

$$\left\{ \delta_{C,(i,j,k)}^{-\frac{1}{2}} \cos\frac{1}{2}\varphi_{C,(i,j,k)} - \tan^{-1}\frac{\delta_{C,(i,j,k)}^{\frac{1}{2}} \sin\frac{1}{2}\varphi_{C,(i,j,k)} + \tau_{C,(i,j,k)}\sin\theta_{C,(i,j,k)}}{\delta_{C,(i,j,k)}^{\frac{1}{2}} \cos\frac{1}{2}\varphi_{C,(i,j,k)} + \tau_{C,(i,j,k)}\cos\theta_{C,(i,j,k)}} + \right.$$

$$\left. \zeta_{C,(i,j,k)} \delta_{C,(i,j,k)}^{-\frac{3}{2}} \cos\left(\frac{3}{2}\varphi_{C,(i,j,k)} - \theta_{C,(i,j,k)}\right) - \zeta_{C,(i,j,k)} \delta_{C,(i,j,k)}^{-\frac{1}{2}} \sin\frac{1}{2}\varphi_{C,(i,j,k)} \right\}$$

where, $$\tau_{C,(i,j,k)} = \left(1 + \zeta_{C,(i,j,k)}^2\right)^{\frac{1}{2}} \quad (7)$$

$$\varphi_{C,(i,j,k)} = \text{arccot}\left\{\frac{\left[\left(\frac{r_c}{R_j}\right)^2 + \zeta_{C,(i,j,k)}^2 - 1\right]}{2\zeta_{C,(i,j,k)}}\right\} \quad (8)$$

$$\delta_{C,(i,j,k)} = \left\{\left[\left(\frac{r_c}{R_j}\right)^2 + \zeta_{C,(i,j,k)}^2 - 1\right]^2 + 4\zeta_{C,(i,j,k)}^2\right\}^{\frac{1}{2}} \quad (9)$$

$$\theta_{C,(i,j,k)} = \arctan\left(\frac{1}{\zeta_{C,(i,j,k)}}\right) \quad (10)$$

where, $\zeta_{c,(i,j,k)}$ denotes a ratio of the perpendicular distance between point C to the fracture surface of crack $F_{i,j,k}$ to a radius $R_{i,j,k}$ of the crack, and $r_c$ denotes the distance between the perpendicular projection point of the point C onto the fracture surface of the crack $F_{i,j,k}$, and the crack center. $P_{i,j,k}$ denotes a modified uniform net internal pressure generated by a uniformly pressurized ellipsoidal crack. Considering the complete elastic solution of the internal pressure of the crack for each inhomogeneous and transient state may be a main computational bottleneck. For fast computation, the inhomogeneous pressure may be replaced by a homogeneous pressure and the homogeneous pressure may be chosen at each time step to generate a crack with the same volume as the actual crack opened by the inhomogeneous internal pressure. i.e.

$$P_{i,j,k} = \frac{3}{16}\frac{E' V_{i,j,k}}{R_{i,j,k}^3} \quad V_{i,j,k} = 2\pi \int_0^{R_{i,j,k}(t)} W_{i,j,k}(r, t) r dr \quad (11)$$

where, $V_{i,j,k}$ denotes a volume injected into the crack $F_{i,j,k}$ and preserved inside the crack; and E' denotes a parameter combines Young's modulus with Poisson's ratio v is given by Eq. (24). $W_{i,j,k}(r, t)$ denotes the opening of the crack $F_{i,j,k}$; r denotes a radial integration factor.

The other variables consist of the lengths of the crack $F_{i,j,k}$ (i.e., the crack radii $R_{i,j,k}$) along with equations (4) and (5):

$$\tau_{C,(i,j,k)} = \left(1 + \zeta_{C,(i,j,k)}^2\right)^{\frac{1}{2}} \tag{12}$$

$$\delta_{C,(i,j,k)} = \left\{\left[\left(\rho_{C,(i,j,k)}\frac{R_{i,j,k}}{L_{C,(i,j,k)}}\right)^2 + \zeta_{C,(i,j,k)}^2 - 1\right]^2 + 4\zeta_{C,(i,j,k)}^2\right\}^{\frac{1}{2}}$$

$$\theta_{C,(i,j,k)} = \arctan\left(\frac{1}{\zeta_{C,(i,j,k)}}\right) \tag{13}$$

$$\varphi_{C,(i,j,k)} = \text{arccot}\left\{\left[\left(\rho_{C,(i,j,k)}\frac{R_{i,j,k}}{L_{C,(i,j,k)}}\right)^2 + \zeta_{C,(i,j,k)}^2 - 1\right] \Big/ 2\zeta_{C,(i,j,k)}\right\}$$

Considering that there are deformations between wells, segments, and clusters due to fracturing modification in a fracturing process of a well plant, and these deformations may then change the stress distribution in the formation. As the segmental fracturing is a dynamic process, the magnitude of the stress at any point C in the space may be the result of a cumulative stress accumulation, as in the following equation:

$$\sigma_c = \Sigma_i^N \Sigma_j^{ni} \Sigma_k^{mj} \sigma_{C,(i,j,k)}(\zeta_{C,(i,j,k)}, \rho_{C,(i,j,k)}, t) \tag{14}$$

where, N denotes a number of wells in a well group that already have segments that are fractured, $n_i$ denotes the number of segments that have been fractured in the ith well; and $m_j$ denotes a total number of cracks that have been fractured simultaneously in the jth segment.

The embodiment calculates the stress distribution of surrounding rocks of the operating well group, and a magnitude of a stress borne by an arbitrary crack may be obtained by simply substituting the coordinates of point C in the above equation with the coordinates of the fracture surface.

Part II, crack expansion pattern calculation

In the process of segmental fracturing, it may be necessary to first set up a plurality of perforation clusters in a horizontal segment of an oil and gas well, and then inject high-pressure fracturing fluids at each perforation cluster simultaneously, based on a propagation condition of linear elastic crack mechanics (LEFM), when a crack criterion $K_I = K_{IC}$, as given by Rice (1968), is satisfied, a rock body may rupture in a direction perpendicular to the minimum in-situ peri-compressive stress $\sigma_{min}$, which creates a crack. $K_I$ denotes a stress intensity factor for mode I (open mode) and $K_{IC}$ denotes a crack toughness of the crack.

However, to continue to expand the crack, the stress exerted by the surrounding rock may be overcome for the crack to grow and extend, thus completing the fracturing operation. Through the stress $\sigma_c$ applied to the crack surface calculated by Eq. (14), the embodiment may utilize a crack expansion energy equation to obtain the energy $W_I$ consumed by the crack to resist a stress action during expansion. Taking the crack $F_{i,j,k+1}$ as an example, an action made by the crack $F_{i,j,k+1}$ to overcome the compressive stress from the crack $F_{i,j,k}$ for expansion may be:

$$\dot{W}_{I(i,j,k+1)} = -2\pi \tag{15}$$

$$\left(\int_{R_W}^{\min(R_{i,j,k}, R_{i,j,k+1})} \sigma_{i,j,k}\frac{\partial w_{i,j,k+1}}{\partial t} r dr + \right.$$

$$\left. \sigma_{i,j,k}\frac{dR_{i,j,k}}{dt}R_{i,j,k}w_{i,j,k+1}\left(\frac{R_{i,j,k}}{R_{i,j,k+1}}\right)\right)$$

where, $\sigma_{i,j,k}$ denotes an interaction force exerted by the crack $F_{i,j,k}$, and $W_{i,j,k+1}$ denotes an opening of the neighboring crack.

The crack, in addition to overcome the stress effects from adjacent simultaneously fracturing cracks, may also need to overcome the stress $\sigma_C$ induced from the fracturing crack due to deformation. The calculation of the power is given by the following formula:

$$\dot{W}_{i,j,k} = Q_{i,j,k}\int_{z_0}^{z_t}\int_{y_0}^{y_t}\int_{x_0}^{x_t}\Sigma_i^N\Sigma_j^{ni}\Sigma_k^{mj}\sigma_{C,(i,j,k)}(x,y,z,t)\,dxdydz \tag{16}$$

Upper and lower limits of an integration in Eq. (16) may be determined by the expansion pattern of the crack in a three-dimensional (3D) space. The impact of the stress distribution on the flow distribution may be obtained by importing a rate of the action done by the crack to overcome the stresses as calculated above into We on the right side of the power balance equation, which is expresses as:

$$p_{fo}Q_{i,j,k} = \dot{W}_f + D_f \tag{17}$$

where, $\dot{W}_f$ denotes the power consumed by the fluid to act on a solid; and $D_f$ denotes an input power consumed by the flow of fluid.

The left side of Eq. (17) is a total input power (a product of the pressure and the injected flow rate) for the ith crack. The two items on the right side of Eq. (17) are, respectively, the power $\dot{W}_f$ consumed by the fluid to act on the solid, which consists of four main components respectively: a rate $W_I$ of the action done by the compressive stress induced by the crack i on the other crack, a strain energy rate U generated by rock deformation, an action $\sigma_{min}Q_i$ done by the crack to overcome the minimum geo-stress, a power $\dot{W}_{i,j,k}$ of the crack consumed to overcome the stress from the fractured crack, and a rate $F_C$ of an energy dissipation associated with the rock fragmentation, which are expressed as:

$$\dot{W}_f = W_I + U + \sigma_{min}Q_{i,j,k} + \dot{W}_{i,j,k} + F_C \tag{18}$$

The second part of the above Eq. (18) is an input power consumed by the flow of fluid. The input power may be the energy dissipation rate $F_C$ associated with the flow of a viscous fluid, a fluid energy loss rate $D_L$ associated with a seepage, and an energy loss rate $P_{perf}$ of the fracturing fluid as it passes through the perforation into the formation, which are expressed as:

$$D_f = F_f + D_L + P_{perf} \tag{19}$$

where the energy loss rate $P_{perf}$ is expressed as:

$$P_{perf(i)} = \left(\frac{\alpha\rho}{n_i^2 D_{P(i)}^4 C^2}\right)Q_i(t)^3 \tag{20}$$

where, $\alpha$ denotes a constant factor, whose value is 0.8106; $\rho$ denotes a density of fluid injected into the reservoir; $D_{p(i)}$ denotes a perforation diameter in the ith cluster, which usually ranges from 6 to 15 millimeters (approximately ¼ to ⅝ inch); C denotes that a perforation tunnel itself has a shape factor, which is usually 0.56 before erosion (a sharp perforation) and 0.89 after erosion; $Q_i(t)$ denotes a volume flow rate through the ith perforation cluster at time t; and $n_i$ denotes the perforation hole number of the ith perforation cluster.

The quantities in parentheses of the equation form a portion factor between the power loss and the cube of the flow when the fluid passes through the perforation hole. The energy loss of the fluid at the perforation hole may be exponentially related to the diameter and number of holes, with negative 4th power and negative 2nd power respectively. Due to the relationship, subtle changes of these two perforation parameters may have a great impact on the energy loss of the fluid through the perforation hole, which in turn have a direct effect on the distribution of the fluid among the perforation cluster under a constraint of power balance. As these two parameters may be controlled or intervened by human in the fracturing operation, the perforation number in an individual perforation cluster and the diameters of the perforation holes may be optimized as the main parameter determining an effectiveness of the flow restriction and the energy consumption. After obtaining a real-time fluid flow rate $Q_{i,j,k}$ for each perforation cluster in the segment being operated, the embodiment may rely on the approximate solution of a length, an openness, and a flow pressure of the crack to quantify the effect of the stress between wells, segments, and clusters on the crack.

An iterative flow equation may be substituted into the expression for a traction force $T_{C,(i,j,k)}(\rho_{C,(i,j,k)}, \mu_{i,j,k}^C(t), \psi_{i,j,k}(t))$ of the kth crack $F_{i,j,k}$ within the jth segment of the ith well;

$$T_{C,(i,j,k)}(\rho_{C,(i,j,k)}, \mu_{i,j,k}^c(t), \psi_{i,j,k}(t)) = \tag{21}$$

$$\left(\frac{E'^2 \mu_{i,j,k}^c(t)}{t}\right)^{\frac{1}{3}} \left\{ A\left[\omega - \frac{2}{3(1-\rho_{i,j,k})^{\frac{1}{3}}}\right] - B\left(\ln\frac{\rho_{i,j,k}}{2} + 1\right) + \psi_{i,j,k}(t) \right\} -$$

$$\sum_n^{n,n\neq i} \sum_m^{m,m\neq j} \sum_l^{l,l\neq k} \sigma_{n,m,l}(\zeta_{C,(n,m,l)}, \rho_{C,(n,m,l)}, t)$$

where, $\rho_{C,(i,j,k)}$ denotes a ratio of a distance r between the point C on the crack $F_{i,j,k}$ and the center of the crack $F_{i,j,k}$ to a radius of the crack $R_{i,j,k}$; $\mu_{i,j,k}^C(t)$ denotes a complex fluid viscosity in the crack $F_{i,j,k}$; n denotes the nth well; m denotes the mth segment; l denotes the lth perforation cluster; A and B denote a constant, respectively; $\sigma_{(i,j,k)}$ denotes an interaction stress generated by the crack $F_{i,j,k}$; $\zeta_{C,(n,m,l)}$ denotes a ratio of a projected perpendicular distance $D_{C,(n,m,l)}$ between the point C on a fracture surface of the crack $F_{n,m,l}$ and the fracture surface of the crack $F_{n,m,l}$ to a crack radius $R_{i,j,k}$; $\rho_{C,(n,m,l)}$ denotes a ratio of the distance $L_{C,(n,m,l)}$ between the point C and the center of crack $F_{n,m,l}$ in an expansion direction of the crack $F_{i,j,k}$ to the crack radius $R_{i,j,k}$; and $\Psi_{i,j,k}(t)$ denotes a contribution of the rock toughness to the traction force, which is expressed as $$\psi_{i,j,k}(t) = \tag{22}$$

$$\left(\frac{K_I}{2\sqrt{\frac{R_{i,j,k}(t)}{\pi}}} + \int_0^1 \frac{\sum_{j=1}^{N,j\neq i} \sigma_{C,(i,j,k)}\rho_{C,(i,j,k)}}{\sqrt{1-\rho_{C,(i,j,k)}^2}} d\rho_{C,(i,j,k)}\right) \bigg/ \left(\frac{E'^2 \mu_{i,j,k}^c(t)}{t}\right)^{\frac{1}{3}}$$

where, t denotes the time consumed by injected fluid; E' denotes a parameter of Young's modulus combined with Poisson's ratio v. E' may be given by the following equation:

$$E' = \frac{E}{(1-v^2)} \tag{23}$$

From the last item in the above equation, it may be seen that the traction force considers a stress interference. From the traction force, the opening and the radius of the crack may be derived considering the dynamic stress of the well group fracturing, which are expressed as:

$$R_{i,j,k}(t) = \gamma_{i,j,k}(t)\left(\left(\frac{E't}{\mu_{i,j,k}^c(t)}\right)^{\frac{1}{3}} \int_0^t Q_{i,j,k}(t)dt\right)^{\frac{1}{3}} \tag{24}$$

$$w_{i,j,k} = \frac{8R_{i,j,k}(t)}{\pi E'} \int_{\rho_i}^1 \frac{s}{\sqrt{s^2-\rho_i^2}} \int_0^1 \frac{xT_{i,j,k}(\rho_{i,j,k}\mu_{i,j,k}^c(t), \psi_{i,j,k}(t))}{\sqrt{1-x^2}} dx ds \tag{25}$$

$$\rho_{i,j,k} = r/R_{i,j,k}$$

where, $R_{i,j,k}$ denotes the radius of the crack $F_{i,j,k}$; $\gamma_{i,j,k}(t)$ denotes a radius modification factor of the crack $F_{i,j,k}$; $Q_{i,j,k}(t)$ denotes a fluid displacement entering the crack $F_{i,j,k}$; $w_{i,j,k}(r, t)$ denotes the opening of the crack $F_{i,j,k}$; x and s denote a radial integration factor in the first and second layer integrations, respectively; $\rho_{i,j,k}$ denotes a ratio of the distance between a point on the crack $F_{i,j,k}$ and the center of the crack to $R_{i,j,k}(t)$; and $T_{i,j,k}$ denotes the traction force on the crack $F_{i,j,k}$.

Thus, a crack development pattern may be obtained under different perforation parameter designs, so as to optimize the perforation hole number of the perforation cluster and the perforation hole diameter.

Part III, optimization effectiveness evaluation indicator:

A relationship between a fracturing well capacity q and a crack area A may be:

$$q \approx \frac{kh}{\mu} \frac{\Delta p}{\Delta x}\left(\frac{A}{h}\right) \tag{26}$$

where, $\mu$ denotes the fluid viscosity; $\Delta p$ denotes a pressure difference between a surface pumping pressure and a minimum underground stress; h denotes a reservoir thickness; and $\Delta x$ denotes a distance from a bottom of the well to a wellhead.

Thus, the crack area obtained from the model simulation may directly reflect the capacity. Under the same volume of injected fluid, the embodiment uses the crack area A as an indicator for measuring the fracturing effect, establishes an optimization mode of the perforation parameter with a universality, i.e., the optimization mode that satisfies the needs of an individual well and a group of wells under arbitrary geological conditions, and improves the perforating gun. Considering that the model used here mainly simulates a fracture expansion driven by fluid, the fracture energy may be mainly dissipated in a form of fluid flow rather than a crack rupture, and the crack may tend to expand in a circular shape. The crack area may be calculated as a circular surface area.

$$A = \Sigma_{i=1}^n R_i^2 \pi \tag{27}$$

where, $R_i$ denotes the crack radius.

In this embodiment, the energy consumed per unit area is used as a rating criterion for optimization effectiveness, which is expressed as:

$$E_f = [\Sigma_{k=1}^N \int_0^T p_{fo(k)}(t) Q_{o(k)} dt] / \Sigma_{K=1}^N A_k \tag{28}$$

where, $p_{fo(k)}(t)$ denotes a flow pressure of the fluid inside the crack; $Q_{o(k)}$ denotes a total pumping flow of the corresponding to segment k, $A_k$ denotes a total area of all the cracks within the segment k, and $E_f$ denotes the amount of energy consumed for fracturing cracks in per unit area in Kwh/m².

In this embodiment, the parameter of the stress-coupled perforating gun is optimized as follows:

In S1, recalling the initial basic data of the target operation region from the storage module, construct a perforating gun stress coupling model based on the basic data of the target operation region.

Firstly, an input parameter may be defined based on the known geological parameter including a reservoir parameter and an in-situ stress distribution, and an engineering parameter including a segment, a clustering, and a pump injection program. The input parameter may include: a formation filtration loss factor $C_L$, the Young's modulus E', the Poisson's ratio v, a fluid viscosity μ, a rock fracture toughness $K_1$, a total injected flow $Q_0$, a total pumping time T, a spacing $h_i$ between each perforation cluster within a segment, a segment length Z, and a time step Δt.

Step S2, selecting the perforation number of the perforation cluster and a perforation diameter by Monte Carlo randomization, and form an array trial calculation perforation parameter pair.

The perforation number of the perforation cluster in each perforation cluster within the segment may be randomly selected by Monte Carlo randomization method from 5-20 at a time, and similarly the perforation diameter may also be selected randomly from 0.006-0.015 m, and then the two randomly selected perforation parameters may then be combined to form a trial calculation perforation parameter pair.

Step S3, establishing an initial iterative flow equation based on the perforating gun stress coupling model, and performing a crack expansion pattern calculation to obtain a crack development pattern. For an initial solution, the initial iterative flow $Q_i(t_0)=Q_0/N$ may be prescribed, where $t_0$ denotes an initial time; and N denotes a total number of segments of the individual well.

The initial iterative flow may be substituted into Eqs. (21) to (25) to obtain the crack development pattern.

Step S4, then obtaining a real-time stress distribution state by stress calculation Eq. (14) based on the crack development pattern. The power consumed by the crack to overcome the stress action of the fractured crack may be calculated by Eq. (17). Also, based on the trial calculation perforation parameter pair, a power loss when the fluid passes through the perforation hole may be calculated by Eq. (20), and the power may be substituted into the power balance Eq. (17) along with the other energy power items.

Step S5, calculating the power consumed by the crack to overcome the stress effect of the fractured crack; at the same time, calculating the power loss when the fluid passes through the perforation hole of the perforation based on the trial calculation perforation parameter.

Step S6, obtaining the instantaneous flow $Q_i(t)$ for each perforation cluster for the iteration by performing the power balance equation settlement in Newton's method. Substituting the flow $Q_i(t)$ obtained from this iteration into the algorithm's third operation S3.

Step S7, repeating steps S3 to S6 until a change range of the instantaneous flow $Q_i(t)$ for each perforation cluster is less than a preset threshold. For example, until a desired level of convergence of $Q_i(t)$ is reached, that is, $Q_i(t)$ no longer changes significantly in each iteration, where a value of the change, or a rate of change, is in a range of 0.1%, and proceeding to operation S8, i.e., the next time step.

In some embodiments, a perforation cluster flow for different segments of each individual well may be provided with different preset thresholds. The computing module 150 may determine the preset threshold for a target segment based on the geological parameter of the target segment, and the trial calculation perforation parameter pair.

The target segment refers to the segment for which the preset threshold is to be determined.

In some embodiments, the computing module 150 may construct a vector to be matched based on the geological parameter of the target segment, and the trial calculation perforation parameter pair; obtain a reference vector whose vector distance from the vector to be matched is less than a distance threshold as an associated vector by retrieving in a vector database based on the vector to be matched; and determine a reference threshold corresponding to the associated vector as the preset threshold for the target segment. The vector database may be used to store a number of reference vectors and their corresponding reference thresholds. The reference vectors may be constructed based on the geological parameter, and the trial calculation perforation parameter pair.

With different preset threshold for different perforation cluster flows of different segments, the system may be able to more finely manage and control the perforation cluster flow during the perforation process, thereby reducing unnecessary energy consumption and improving an energy efficiency.

In some embodiments, the computational module 150 may also determine the preset threshold for the target segment based on the geological parameter of the target segment, and the trial calculation perforation parameter pair.

In some embodiments, the threshold model may be a machine learning model. For example, the threshold model may include any one or a combination of a Neural Networks (NN) model or other customized model structure.

In some embodiments, an input to the threshold model may include the geological parameter of the target segment, the trial calculation perforation parameter pair, and an output may include the preset threshold for the target segment. In some embodiments, the input to the threshold model may also include the engineering parameter of the target segment. In some embodiments, the output of the threshold model may also include the difference in perforation cluster flows for the plurality of perforation clusters. The difference in perforation cluster flow refers to a variance of the perforation cluster flows of the plurality of perforation clusters.

The threshold model may be obtained by training. In some embodiments, a training sample may include a sample geologic parameter of a sample segment, and a sample trial calculation perforation parameter pair. In some embodiments, the training sample may also include a sample engineering parameter of the sample segment. In some embodiments, a label of the training sample may include a perforation cluster flow for the sample segment. In some embodiments, the label of the training sample may also include a difference in perforation cluster flow for a plurality of perforation clusters of the sample segment. An exemplary training process may include: inputting the training sample into an initial threshold model, constructing a loss function based on the output of the initial threshold model and the label, iteratively updating the parameter of the initial threshold model based on the loss function until satisfying a preset condition, the training ends, and a trained threshold model may be obtained. The preset condition may include, but not limited to, the loss function converges, a training period reaches the threshold value, etc.

In some embodiments, the training sample may be obtained based on the historical data or may be obtained based on data obtained from simulations performed by the perforating gun stress coupling model. In some embodiments, the plurality of perforation cluster flows may be weighted when each crack of the sample segments obtained by simulating the historical data/mode corresponding to the training sample stops expanding (e.g., the cracks may be relatively stable in terms of their lengths, areas, and radii). The weighted perforation cluster flows may be used as training labels, and the weights may be preset based on a priori experience. In some embodiments, a variance of the plurality of perforation cluster flows may be further calculated, and the variance may be used as the difference in perforation cluster flows of the plurality of perforation clusters of the sample segment to obtain the training label. In some embodiments of the present disclosure, a more appropriate preset threshold may be determined for each segment by using the threshold model, which in turn determines a more reliable the target perforation parameter combination, which helps to improve the effect of the HF to some extent, shorten an HF operation cycle, and save resources.

Step S8, obtaining a total pumping time T required for the flow of each perforation cluster to be less than the preset threshold value, and accumulating to obtain a combined crack area in an individual segment. Steps S3-S7 may be repeated until the desired total pumping time T is reached. A total crack area within an individual segment may then be obtained by calculating the accumulation through Eq. (27).

Step S9, repeating steps S3 to S8 until the crack development patterns of all segments of the individual well and a corresponding total energy consumption are obtained, and obtaining the energy consumed on a per unit fracturing area for the trial calculation perforation parameter pair.

Newton's method may be an iterative algorithm for finding roots of the equation. The power balance means that there is a balance relationship between the changes in pressure and flow in the problem, which is described by the Eqs. (15) to (20). A general idea of the stress-coupled perforating gun may be to balance a stress extrusion resulting from crack expansion by simultaneously manipulating the perforation hole number and the perforation hole diameter to avoid that some cracks are suppressed from developing while only a few cracks develop. The present disclosure balances accuracy and calculating efficiency, allowing tens of thousands of evaluations to be run in a controlled amount of time to reveal how a perforating gun parameter is designed to be expected to be favorable in complex geologic conditions to reduce the energy consumed for crack fracturing per unit area, thereby reducing the energy consumption and the carbon emissions, which has high practical value and popularization value in the field of stress-coupled perforating gun design technology.

Step S10, traversing any trial calculation perforation parameter pair, selecting a perforation parameter combination that achieves the maximum fracture fracturing area with the minimum energy consumption to complete the optimization of the stress-coupled perforating gun. For example, repeating steps S2-S9 until all possible pairs of perforation number and perforation diameter have been accrued, i.e., 16*10=160 trial calculation perforation parameter pairs. With the same volume of injected fluid, and comparing each randomized combination of trial calculation perforation parameter pairs, the perforation parameter combinations that maximize the crack area of the fracture at the minimum cost of the energy consumption may be selected as a design parameter of the stress-coupled perforating gun.

In some embodiments, the computing module 150 may further traverse any trial calculation perforation parameter pair and select at least one trial calculation perforation parameter combination that consumes less energy per unit fracturing area than the energy threshold; select the trial calculation perforation parameter combination with minimum difference in perforation cluster flows of a plurality of perforation clusters based on the at least one trial calculation perforation parameter combination as the target perforation parameter combination; and generate the first control instruction based on the target perforation parameter combination, and send the first control instruction to the operation module to complete the optimization of the stress-coupled perforating gun.

Merely as an exemplary, steps S2-S9 may be repeated until all the possible pairs of the perforation numbers and the perforation diameters, i.e., 16*10=160 perforation parameter pairs, are accumulated, and only the perforation parameter pairs that consume less energy for per unit fracturing area than the energy threshold may be retained. When 5 perforation parameter pairs are remained, the variances of the 5 perforation parameter pairs may be compared, and the perforation parameter combination with the smallest variance may be selected, which is the design parameter of the stress-coupled perforating gun.

As there are a plurality of perforation clusters in a segment, there may be an unevenness in the flow of each perforation cluster, and when the difference in the flow of a plurality of groups of perforation clusters is relatively great, using a minimum energy consumption ratio as the only criterion may result in a situation of greater energy consumption. Merely as an example, assuming that there are perforation clusters A, B, and C, and that there is a large difference among the perforation cluster flows of perforation clusters A, B, and C. When calculating the total pumping time T required for each perforation cluster flow to be less than the preset threshold, a situation where the perforation cluster flow of the perforation cluster A (at a moment T1) has already been less than the preset threshold (it may be assumed that at this point the perforation cluster A generates a relatively stable fracture development pattern which no longer undergoes great changes), however, at this time, the perforation cluster flows of clusters B and C may still be relatively great, and there may still be a certain difference from the preset threshold value (there may still be room for the development of cracks corresponding to clusters B and C, and the fracturing fluids still needs to be injected), and at this time, the fracturing fluids may continue to be injected into cluster A, until the perforation cluster flows of clusters B and C (at a moment T2) are also smaller than the preset threshold value. Then it may be assumed that the fracturing fluid passing through the perforation cluster A from moment T1 to moment T2 is under-utilized, resulting in a portion of the fracturing fluid being wasted. The fracturing fluid utilization may be improved by reducing the difference in perforation cluster flows across the plurality of perforation clusters to try to ensure that the perforation clusters are stopped at the same time.

Figure 2:
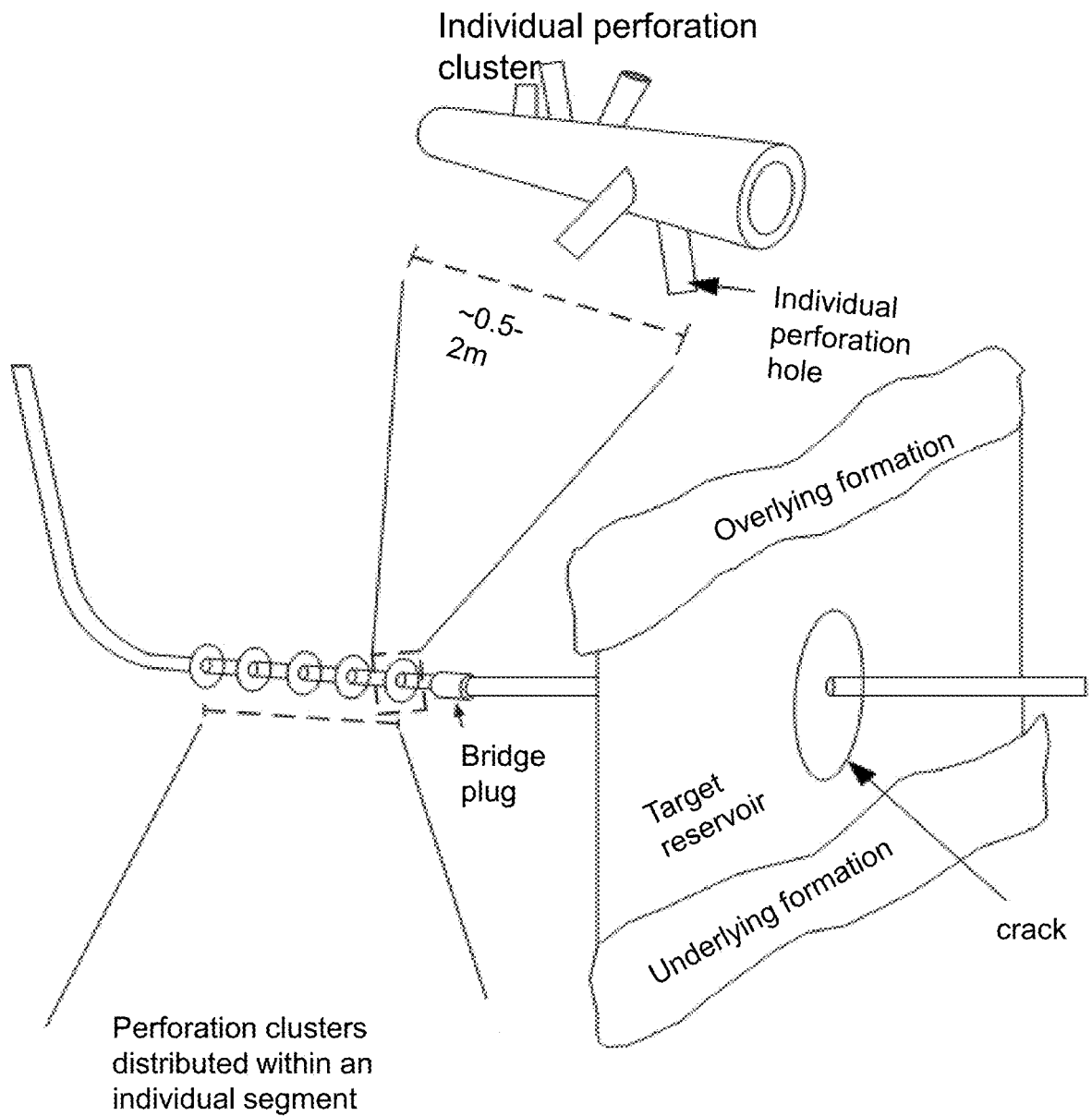
FIG. 2 is a schematic diagram illustrating a structure of an individual well fracturing construction according to some embodiments of the present disclosure.

Here's an actual example:

As shown in FIG. 2, a perforating gun may be a device that must be employed in the HF process and may usually be made of a long, thin steel tube containing a series of explosive substances used to form the plurality of perforating gun clusters inside the wellbore, with n perforating gun holes in each cluster. Usually, the value of n may be in a range of 5 to 20. The perforation diameter may usually be in a range of 6 to 15 millimeters. During the HF, water or other fracturing fluids may flow into an oil and gas reservoir through a perforation hole to form a crack.

Figure 3:
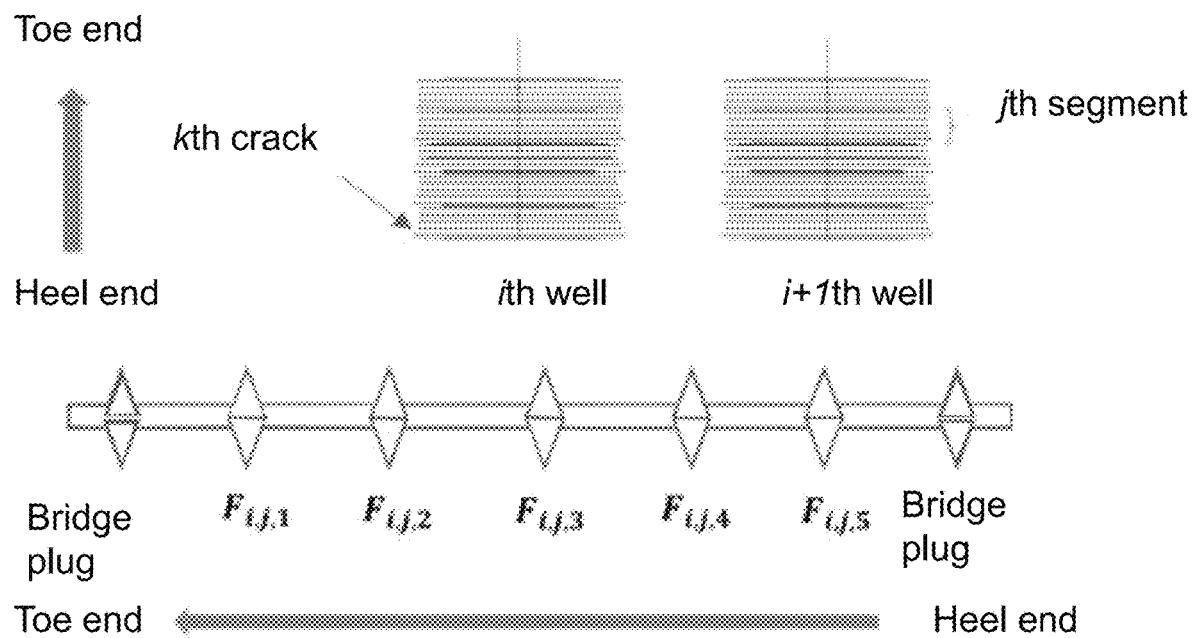
FIG. 3 is a schematic diagram illustrating a fracturing structure of segment and clustering of an individual well according to some embodiments of the present disclosure.

As shown in FIG. 3, the stress-coupled perforation technique may be based on a full-coupling optimization of the number and perforation diameter holes, and the optimization of the two parameters may be based on an accurate prediction of the stress distribution. Considering that the segmental fracturing is a dynamic process, and thus the stress in the formation of the operating well may also dynamic. In order to accurately calculate the stress value, first the cracks corresponding to each perforation cluster may be matrixed in the form of $F_{i,j,k}$, where i denotes the ith well of the cluster, j denotes the jh segment of the well, and k denotes the kth fracture within a segment. The value of k near a toe end may be 1, and the value of k near a heel end may be 5.

In the embodiment, after labeling each crack, the stress at any position in the spacetime may be obtained through the elastic stress equation. Any point C in the reservoir may have a horizontal coordinate x, a vertical coordinate y, and a height coordinate z. The magnitude of the stress at the point C in space due to the deformation of the crack $F_{i,j,k}$ may be calculated.

Figure 5:
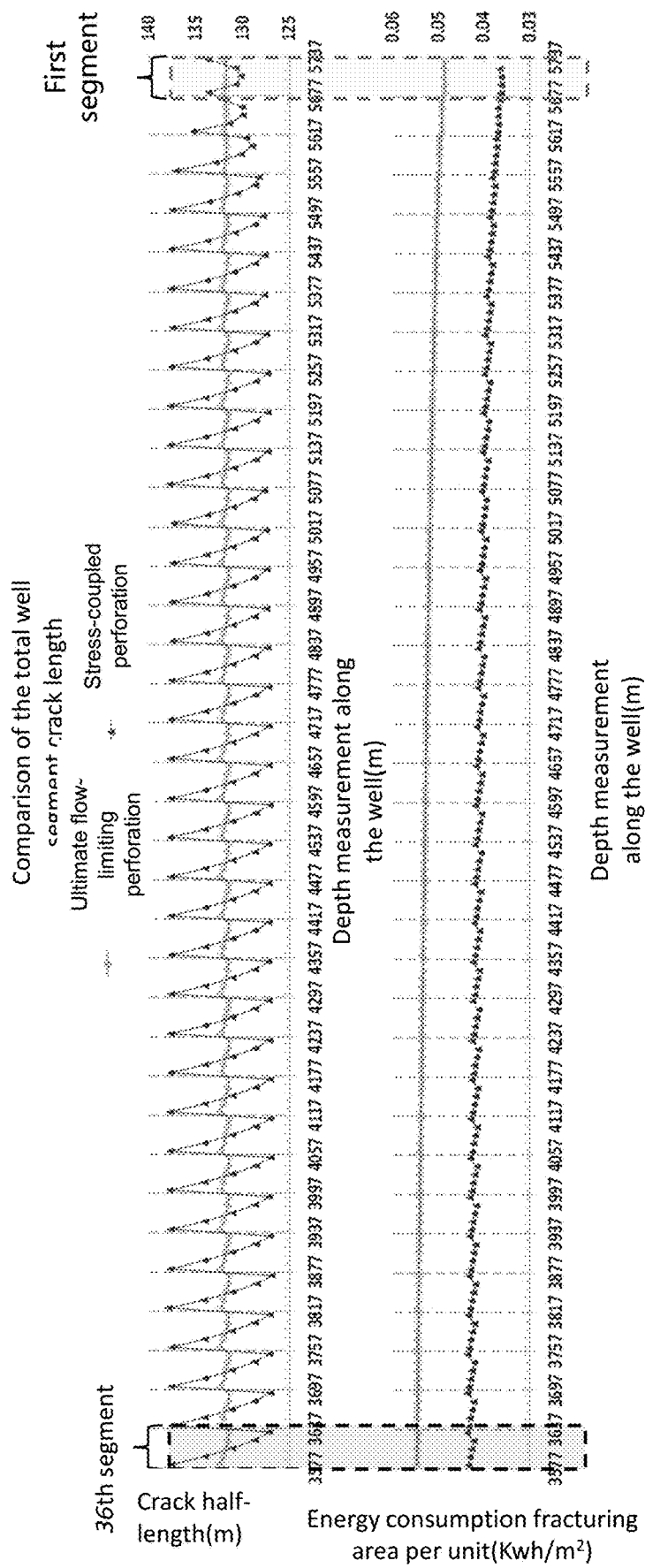
FIG. 5 is a comparison diagram illustrating crack lengths and energy consumptions per unit area for an ultimate flow-limiting perforating gun and a stress-coupled perforating gun according to some embodiments of the present disclosure.

In the embodiment, the effects of the ultimate flow-limiting perforating gun and the stress-coupled perforating gun may be compared through the following two application cases. In order to better demonstrate universality and practicability of the present technology, the present disclosure considers two situations: one is that, in an ideal reservoir homogeneity, the individual well may have a segment space of 60 m, and the five perforation clusters may be symmetrically distributed, with a cluster spacing of 12.5 m. The first perforation cluster near the toe end may be 5 m away from a bridge plug, and the first perforation cluster near the heel end may be 5 m away from the bridge plug on the other side. The second scenario may be well deployment parameter Tables 1 to 4, which are obtained in an actual field experimentation. Extension directions of well trajectories of the four horizontal wells are roughly the same, but the wells are in a non-parallel row, the spacing between the wells in a horizontal stage varies from 200 to 800 m, and a difference in vertical depth is within 100 m (FIG. 5), a target points are basically in one reservoir, and the reservoir parameter around the wells changes along the wells with a relatively strong non-homogeneity, especially for rock physical properties such as a porosity and a permeability, which in turn causes a strong variability of the loss factor along the well.

TABLE 1

HF1-4 Well Slope Data Table

| Number | Depth (m) | X (m) | Y (m) | Z (m) |
|---|---|---|---|---|
| 1 | 22.39 | −0.0065 | −0.03024 | −22.39 |
| 11 | 307.56 | −0.63218 | −0.72711 | −307.55 |
| 21 | 592.31 | −3.10382 | −2.24151 | −592.28 |
| 32 | 909.13 | −7.58611 | 3.030646 | −908.85 |
| Kickoff point | 995.12 | −7.8382 | 5.523728 | −994.77 |
| 46 | 1119.24 | −2.52098 | 18.02427 | −1118.03 |
| 57 | 1376.55 | 33.20942 | 81.41205 | −1367.1 |
| 62 | 1519.8 | 60.7538 | 129.1615 | −1501.91 |
| 72 | 1806.36 | 136.2324 | 259.8362 | −1755.82 |
| 81 | 2065.86 | 211.7492 | 400.1532 | −1972.1 |
| 87 | 2237.66 | 265.172 | 503.9858 | −2106.7 |
| 91 | 2352.28 | 305.3612 | 575.424 | −2195.48 |
| 101 | 2638.85 | 416.6815 | 757.913 | −2415.51 |
| 106 | 2760.55 | 462.5941 | 831.7836 | −2511.98 |
| 116 | 3047.21 | 571.5915 | 1012.187 | −2733.75 |
| 121 | 3192.66 | 621.4079 | 1100.982 | −2847.91 |
| 131 | 3421.14 | 703.2794 | 1249.07 | −3019.67 |

TABLE 1-continued

HF1-4 Well Slope Data Table

| Number | Depth (m) | X (m) | Y (m) | Z (m) |
|---|---|---|---|---|
| 137 | 3583.51 | 758.5736 | 1368.041 | −3122.72 |
| 142 | 3728.29 | 796.7539 | 1487.263 | −3177.04 |
| A target | 3750 | 801.6582 | 1505.632 | −3181.63 |
| 152 | 3985.64 | 827.4815 | 1692.225 | −3205.33 |
| 157 | 4159.75 | 823.5011 | 1815.456 | −3220.72 |
| 163 | 4332.08 | 819.017 | 1937.06 | −3235.75 |
| K1 target | 4402 | 818.1286 | 1987.048 | −3241.98 |
| 169 | 4474.25 | 817.8901 | 2039.142 | −3248.85 |
| 178 | 4734.94 | 815.7403 | 2225.641 | −3280.51 |
| K2 target | 4886 | 814.1327 | 2332.796 | −3305.02 |
| 188 | 4971.83 | 810.2417 | 2390.747 | −3324.73 |
| 194 | 5145.22 | 800.9969 | 2505.667 | −3370.77 |
| 200 | 5289.89 | 791.7501 | 2599.962 | −3411.45 |
| 210 | 5578.27 | 774.1227 | 2786.197 | −3502.69 |
| 220 | 5865.88 | 760.0606 | 2975.791 | −3588.07 |
| 226 | 6010.14 | 751.6018 | 3068.967 | −3634.7 |
| B target | 6023 | 750.8057 | 3077.166 | −3639.16 |

TABLE 2

HF1-5 Well Slope Data Table

| Number | Depth (m) | X (m) | Y (m) | Z (m) |
|---|---|---|---|---|
| 1 | 20.13 | 0.007775 | 0.047331 | −20.13 |
| 6 | 163.39 | 0.522561 | 0.910207 | −163.38 |
| 12 | 308.32 | 0.433179 | 1.422072 | −308.31 |
| 16 | 424.46 | −0.25633 | 1.009453 | −424.44 |
| 22 | 598.31 | −1.55919 | 0.236638 | −598.29 |
| 27 | 742.97 | −2.23606 | 0.564492 | −742.94 |
| 37 | 1034.57 | −3.50573 | −0.33336 | −1034.54 |
| 42 | 1179.12 | −4.04796 | −0.19524 | −1179.08 |
| 47 | 1323.8 | −3.58122 | 2.019871 | −1323.74 |
| 52 | 1468.42 | −2.62579 | 5.546429 | −1468.3 |
| 57 | 1613.03 | −0.54552 | 11.1076 | −1612.78 |
| 62 | 1728.87 | 1.766438 | 16.58402 | −1728.47 |
| 67 | 1873.71 | 6.921751 | 29.13625 | −1872.66 |
| 72 | 2018.7 | 18.32656 | 52.15463 | −2015.65 |
| 77 | 2165.93 | 38.11662 | 89.49161 | −2157.75 |
| 81 | 2281.96 | 59.83434 | 130.7973 | −2265.73 |
| 97 | 2745.06 | 183.5954 | 370.2431 | −2655.95 |
| 107 | 3032.14 | 273.6373 | 556.9276 | −2867.55 |
| 117 | 3240 | 338.742 | 687.1569 | −3025.97 |
| 132 | 3581.47 | 416.5322 | 936.9196 | −3206.84 |
| A | 3650 | 418.0677 | 986.9821 | −3218.38 |
| 143 | 3841.32 | 419.1434 | 1126.226 | −3234.08 |
| 153 | 4101.28 | 409.4093 | 1307.507 | −3257.1 |
| K1 | 4136.06 | 408.7211 | 1332.221 | −3259.86 |
| 155 | 4159.53 | 408.2842 | 1348.896 | −3262.03 |
| 165 | 4422.74 | 404.1335 | 1536.606 | −3282.71 |
| 170 | 4567.54 | 403.6274 | 1641.374 | −3288.91 |
| 175 | 4711.96 | 402.9185 | 1745.701 | −3295.5 |
| K2 | 4812.09 | 400.5908 | 1816.196 | −3308.31 |
| 185 | 5000.43 | 394.9547 | 1946.299 | −3346.22 |
| 195 | 5285.99 | 387.0656 | 2140.54 | −3423.18 |
| K3 | 5288.58 | 387.0375 | 2142.331 | −3423.91 |
| 201 | 5459.47 | 385.4727 | 2260.446 | −3471.75 |
| 209 | 5689.87 | 384.1734 | 2421.444 | −3530.22 |
| 214 | 5834.04 | 380.8627 | 2521.026 | −3563.69 |
| 217 | 5903 | 378.8888 | 2567.967 | −3581.92 |

TABLE 3

HF1-6 Well Slope Data Table

| Number | Depth (m) | X (m) | Y (m) | Z (m) |
|---|---|---|---|---|
| 1 | 0 | 0 | 0 | 0 |
| 6 | 140.91 | 0.492784 | 1.257483 | −140.9 |
| 16 | 424.86 | 1.012952 | 4.094634 | −424.83 |
| 22 | 598.71 | −1.76576 | 5.717882 | −598.65 |

TABLE 3-continued

HF1-6 Well Slope Data Table

| Number | Depth (m) | X (m) | Y (m) | Z (m) |
|---|---|---|---|---|
| 27 | 743.37 | −4.16897 | 6.620927 | −743.28 |
| 32 | 888.18 | −6.75633 | 6.965589 | −888.07 |
| 46 | 1292.93 | −7.69027 | 13.05261 | −1292.76 |
| 51 | 1437.77 | −8.60492 | 14.21567 | −1437.59 |
| 57 | 1611.19 | −10.2395 | 19.24968 | −1610.93 |
| 62 | 1755.99 | −8.64571 | 24.57438 | −1755.62 |
| 72 | 2045.89 | −5.55859 | 39.98215 | −2045.06 |
| 77 | 2190.84 | −3.13615 | 54.80968 | −2189.23 |
| 82 | 2335.52 | −0.97603 | 74.61982 | −2332.48 |
| 86 | 2451.4 | 1.6793 | 101.6987 | −2445.08 |
| 92 | 2627.52 | 6.248358 | 158.6401 | −2611.43 |
| 97 | 2772.2 | 12.06212 | 220.0481 | −2742.26 |
| 101 | 2888.04 | 19.58014 | 282.985 | −2839.13 |
| 107 | 3039.52 | 29.83924 | 378.6667 | −2955.94 |
| 111 | 3151.6 | 34.3215 | 452.6214 | −3040.01 |
| 116 | 3295.9 | 36.67809 | 561.0901 | −3134.8 |
| 121 | 3410.65 | 36.99144 | 660.0446 | −3192.72 |
| 126 | 3553.7 | 36.58024 | 794.2039 | −3241.53 |
| 134 | 3756.39 | 33.69889 | 994.0645 | −3274.68 |
| 143 | 4015.25 | 27.53 | 1251.893 | −3296.27 |
| 147 | 4102.87 | 21.52991 | 1339.189 | −3300.75 |
| 152 | 4247.3 | 11.42758 | 1482.577 | −3314.61 |
| 158 | 4382.09 | 4.956229 | 1616.195 | −3330.97 |
| 162 | 4478.25 | 1.926759 | 1712.066 | −3337.62 |
| 167 | 4622.93 | −1.12578 | 1856.226 | −3349.09 |
| 173 | 4796.11 | −2.9853 | 2028.686 | −3364.63 |
| 178 | 4934.72 | −4.52793 | 2165.548 | −3386.36 |
| 188 | 5200.32 | −4.37556 | 2427.71 | −3428.48 |
| 193 | 5344.42 | −2.47641 | 2570.334 | −3448.7 |
| 199 | 5488.38 | −1.52959 | 2710.946 | −3479.51 |
| 203 | 5603.96 | −0.75336 | 2823.514 | −3505.72 |
| 206 | 5680 | 0 | 2897.355 | −3523.87 |

TABLE 4

HF1-7 Well Slope Data Table

| Number | Depth (m) | X (m) | Y (m) | Z (m) |
|---|---|---|---|---|
| 1 | 0 | 0 | 0 | 0 |
| 6 | 137.97 | 0.274802 | 0.037468 | −137.97 |
| 12 | 307.15 | −0.15719 | −0.79799 | −307.14 |
| 17 | 427.45 | −1.95636 | −1.38676 | −427.42 |
| 27 | 714.14 | −11.3548 | −5.91191 | −713.94 |
| 32 | 857.41 | −17.3566 | −9.05779 | −857.08 |
| 36 | 972.01 | −22.4585 | −11.7626 | −971.56 |
| 42 | 1144.87 | −31.3844 | −15.8786 | −1144.17 |
| 46 | 1260.95 | −38.2009 | −18.2648 | −1260 |
| 51 | 1404.18 | −44.8931 | −19.3243 | −1402.99 |
| 57 | 1576.14 | −56.3482 | −20.8192 | −1574.32 |
| 61 | 1690.75 | −67.2123 | −23.5665 | −1688.23 |
| KOP | 1719.41 | −69.7515 | −24.3336 | −1716.74 |
| 67 | 1862.69 | −87.1793 | −29.5545 | −1858.62 |
| 72 | 2005.93 | −115.617 | −37.304 | −1998.02 |
| 77 | 2149.17 | −150.253 | −45.8892 | −2135.42 |
| 86 | 2408.57 | −217.271 | −65.242 | −2383.29 |
| 92 | 2580.52 | −268.295 | −81.2275 | −2545.33 |
| 102 | 2867.19 | −380.013 | −111.849 | −2801.07 |
| 112 | 3119.02 | −496.396 | −134.279 | −3009 |
| 122 | 3408.48 | −634.939 | −108.705 | −3198.72 |
| 131 | 3668.14 | −717.854 | −3.23236 | −3296.13 |
| 136 | 3784.14 | −734.272 | 67.64918 | −3315.07 |
| 151 | 4188.16 | −779.155 | 327.9069 | −3338 |
| K1 | 4212.68 | −781.263 | 344.0664 | −3341.08 |
| 162 | 4442 | −803.862 | 493.4474 | −3364.15 |
| 172 | 4704.65 | −828.746 | 665.282 | −3390.75 |
| 177 | 4793.66 | −837.358 | 720.2202 | −3428.78 |
| 187 | 5053.56 | −860.253 | 890.1756 | −3469.82 |
| 197 | 5339.9 | −886.305 | 1072.914 | −3540.68 |
| 208 | 5657.6 | −916.083 | 1276.001 | −3613.57 |
| 213 | 5801.86 | −931.278 | 1367.464 | −3643.71 |
| 216 | 5888 | −940.414 | 1422.1 | −3661.28 |

Aiming at these two situations, two strategies may be adopted based on the basic mode of perforation parameter optimization mentioned above. For a relatively homogeneous reservoir, optimizing a set of stress-coupled perforating gun parameters globally and apply the set of stress-coupled perforating gun parameters to all the segments, i.e., a global stress-coupled perforating gun. For the fracturing of the plurality of wells in the non-homogeneous reservoir, another scheme may be adopted, i.e., the stress-coupled perforating gun may be independently designed for each segment, that is, the optimization of the perforation parameter of each segment may be calculated based on a stress field and the reservoir parameter of the segment being operated. That is, the optimization of perforation parameter of each segment may be based on the stress field and the reservoir parameter of the segment being operated, that is, a segmented stress-coupled perforating gun. In this way, the non-homogeneity between segments may be minimized, and the crack development of each segment may be developed as close as possible, so as to effectively develop the reservoir. Additionally, considering the number of well segment segments and the corresponding size of the calculated data, and further considering computational resources consumed by the existing great-scale scientific computation, the global and local stress-coupled perforating guns may be flexibly used to address the reservoir non-homogeneity with different intensities. As a result, while improving the energy consumption effect, the calculation efficiency may be balanced so as to reduce an arithmetic power demand. Therefore, an energy consumption ratio may be improved at the calculation stage.

A similarity between the two comparison cases may be that both of them adopt a classical pump injection procedure, and the injected fluid may be widely used slippery water with a viscosity of 0.003 Pa·s, and a displacement rate of 0.15 m³/s. A total injected fluid volume of each segment may be 560 m³. The two types of perforating guns compared have the same selection range of parameter, as detailed in Table 5:

TABLE 5

Parameter selection from an ultimate flow-limiting perforating gun and a stress-coupled perforating gun

| Relevant parameter | Parameter of ultimate flow-limiting perforating gun | Parameter of stress-coupled perforating gun |
|---|---|---|
| Number of holes (hole/cluster) | 10 | 5~20 |
| hole diameter (m) | 0.01 | 0.006~0.015 |

Figure 4:
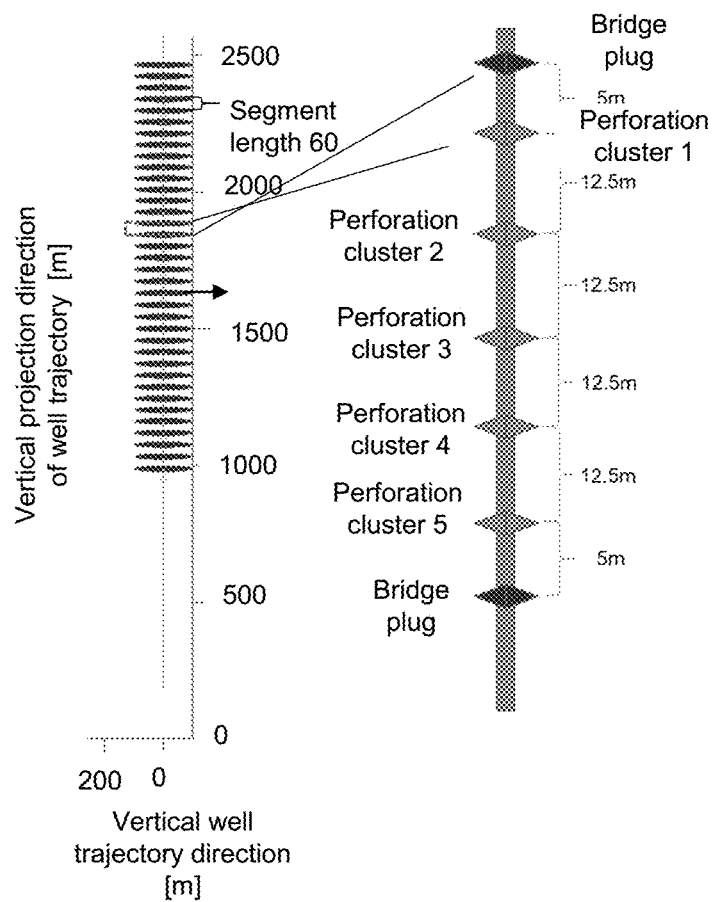
FIG. 4 is a schematic diagram illustrating segment and clustering of an individual well according to some embodiments of the present disclosure.

As shown in FIG. 4, this embodiment cites an example of an application of an individual well global stress-coupled perforating gun in the homogeneous reservoir.

Here, the perforating gun parameter, i.e., the perforation number of an individual perforation cluster and the perforation diameter, may be taken as variables, and a random parameter combination may be performed using the Monte Carlo randomization. According to the current international standard parameter range, 1 mm may be taken as a diameter step, then there may be a total of 10*16=160 perforation parameter pairs in full combination. In each simulation, one of these 160 parameter pairs may be extracted for assigning the trial calculation perforation parameter, which is applied in all segments. The perforation parameter for each fracturing segment may be constant, i.e., a global stress-coupled perforating gun may be used. That is, in a relatively homogeneous and ideal situation, for the individual well, the model may use the individual perforation parameter pair to simulate a whole well segment. Finally, by comparing the energy consumed per unit fracturing area after the operation of the whole well segment, the optimal combination of the perforation number of the individual perforation cluster and a perforation diameter may be obtained, which is the design parameter of the global stress-coupled perforating gun.

As shown in FIG. 4, the well may adopt a segmented clustered scheme commonly used in the field operation, i.e., a segment length may be 60 m, and 5 perforation clusters may be distributed in a centrally symmetric manner, with a cluster spacing of 12.5 m, and distance between the perforation clusters on both ends and the bridge plugs may be 5 m. The whole segment length of the operation may be 2160 m, with a total of 36 segments.

The pumping process and the reservoir parameter may be as follows:

$C_L=8.89*10^{-6}$ m/s$^{1/2}$, $E$=32.16 GPa, $v$=0.23,
$C_{ro}$=1.5*10$^9$ Pa$^{-1}$, $K_{IC}$=1 Mpa·m$^{1/2}$, $\sigma_{min}$=63.63 Mpa, $R_W$=0.2 m, $\mu$=0.003 pa·s, $P_r$=50.90 Mpa
$Q_0$=0.15 m$^3$/s, $V_{inj}$=540 m$^3$ where, $C_L$ denotes the formation filtration loss factor, which depends on both rock and fluid properties, and is used to describe a sealing ability of the surrounding rock to the injected fluid; E denotes the Young's modulus, v denotes the Poisson's ratio, $C_{ro}$ denotes a rock compression factor, $K_{IC}$ denotes the rock fracture toughness, $\sigma_{min}$ denotes the minimum ground stress, $R_W$ denotes a wellbore diameter, $\mu$ denotes the fluid viscosity, $P_r$ denotes the reservoir pressure, $Q_0$ denotes the fluid injection flow, and $V_{inj}$ denotes the total injection volume of an individual fluid.

Figure 6:
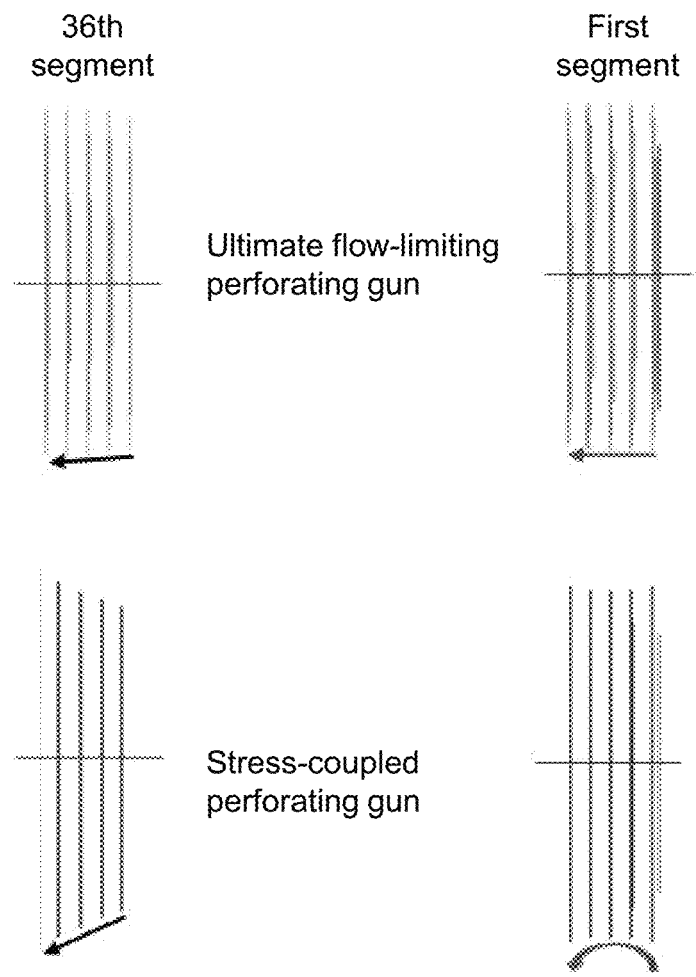
FIG. 6 is an enlarged schematic diagram of first segment and $36^{th}$ segment of FIG. 5.
Figure 7:
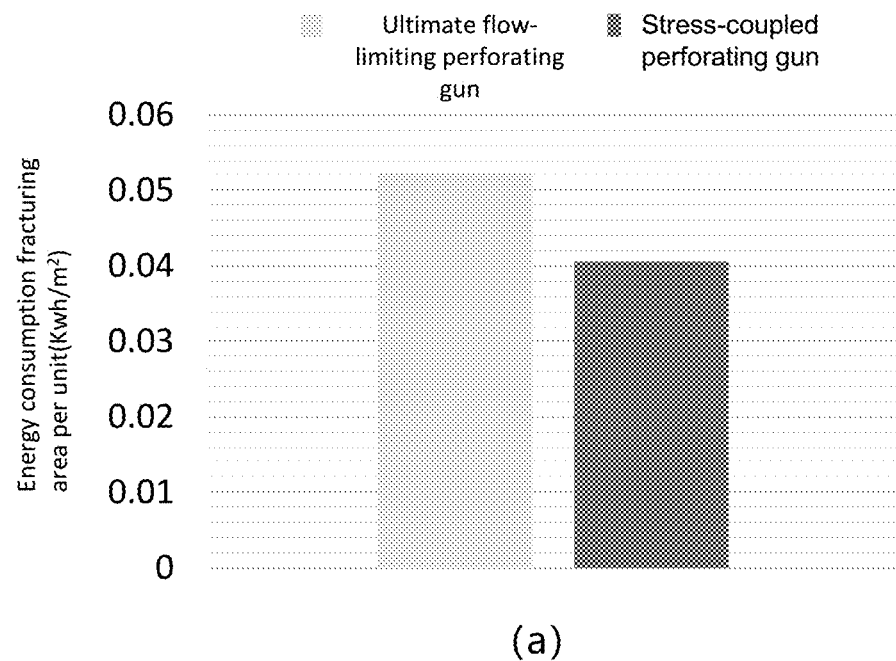
FIG. 7 is a comparison diagram illustrating absolute values and relative values of an energy consumption per unit area of an ultimate flow-limiting perforating gun and a stress-coupled perforating gun according to some embodiments of the present disclosure.
Figure 7:
Figure 8:
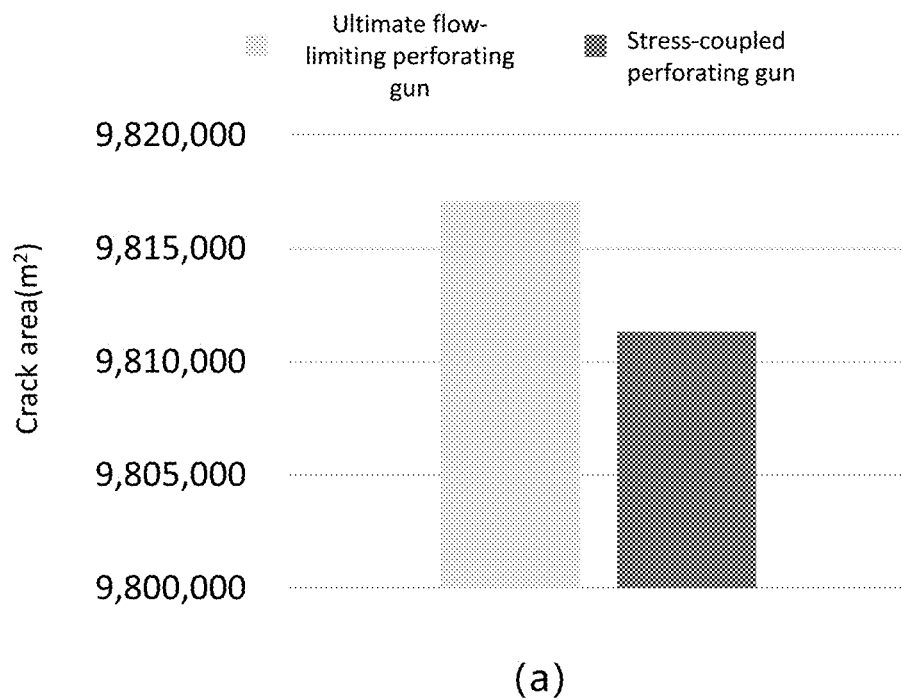
FIG. 8 is a comparison diagram illustrating absolute values and relative values of an energy consumption per unit area of an ultimate flow-limiting perforating gun and a stress-coupled perforating gun according to some embodiments of the present disclosure.
Figure 8:
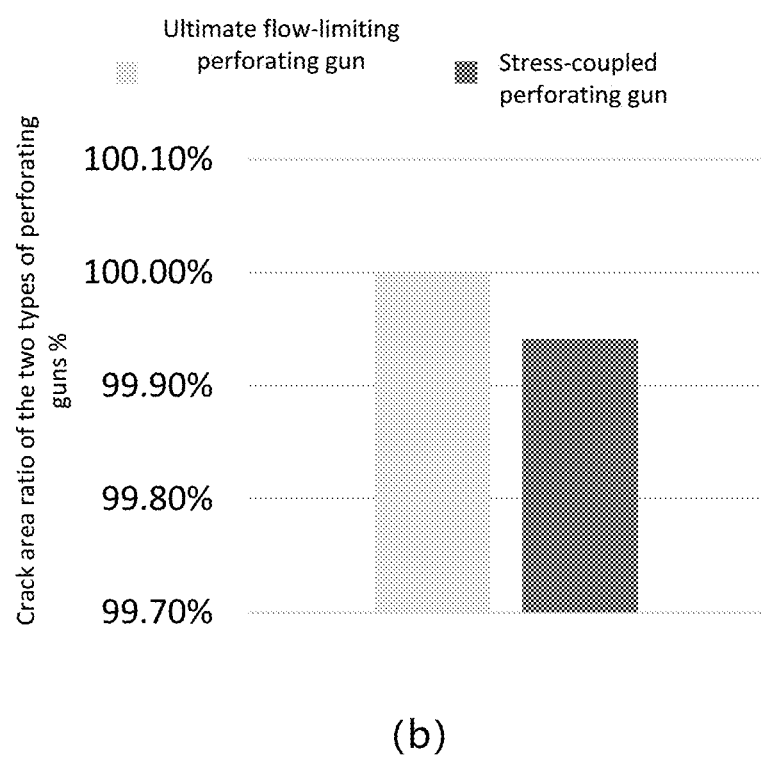

Referring to FIGS. 5 to 11, the stress-coupled perforating gun may achieve 22% lower energy consumption per unit fracturing area than the ultimate flow-limiting perforating gun at the cost of less than 0.2% of the total fractured area, which indicates that the stress-coupled perforating gun is more effective in the ideal homogeneous situation. After this, a comparison between the stress-coupled perforating gun and the ultimate flow-limiting perforating gun in non-homogeneous wells plant, which is more compatible with the field construction environment, is carried out to continue to verify the effectiveness of the stress-coupled perforating gun in the situation of a more realistic construction geological situation. Also, the arrows in FIG. 6 represent a changing trend of the crack lengths within the selected segments along the well toward the toe end. (a) in FIG. 7 is a comparison diagram illustrating absolute values of the energy consumption per unit area of the ultimate flow-limiting perforating gun and the stress-coupled perforating gun, and (b) in FIG. 7 is a comparison diagram illustrating the relative values of the energy consumption per unit area of the ultimate flow-limiting perforating gun and the stress-coupled perforating gun. (a) in FIG. 8 is a comparison diagram illustrating absolute values of the energy consumption per unit area of the ultimate flow-limiting perforating gun and the stress-coupled perforating gun, and (b) in FIG. 8 a comparison diagram illustrating the relative values of the energy consumption per unit area of the ultimate flow-limiting perforating gun and the stress-coupled perforating gun.

Figure 9:
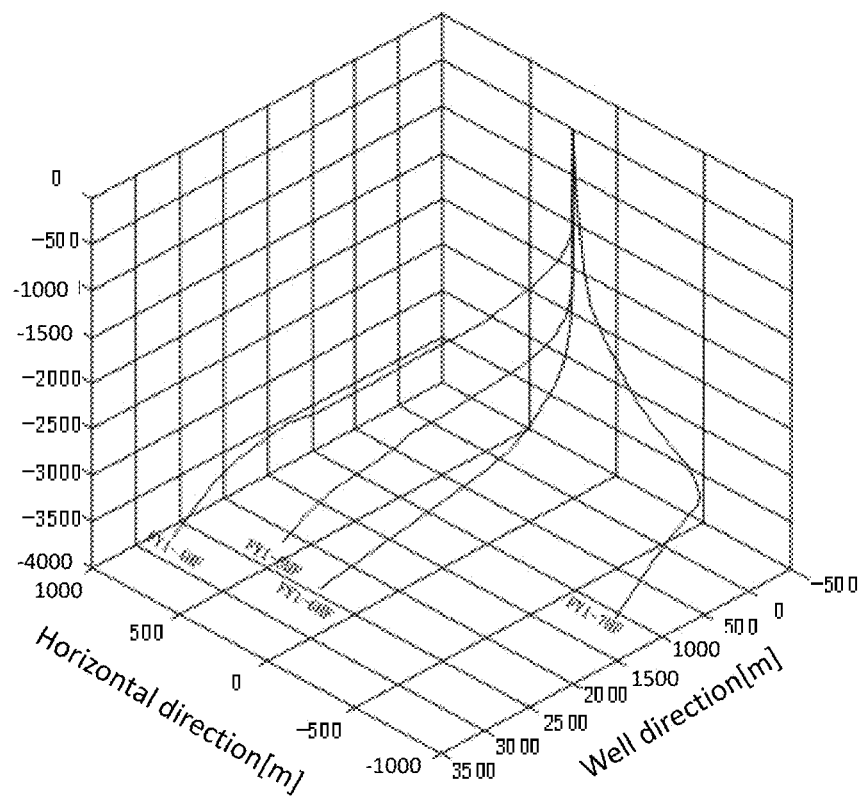
FIG. 9 is a three-dimensional (3D) coordinate diagram illustrating trajectories of well FY-4 to FY-7 in a field implementation cases according to some embodiments of the present disclosure.
Figure 10:
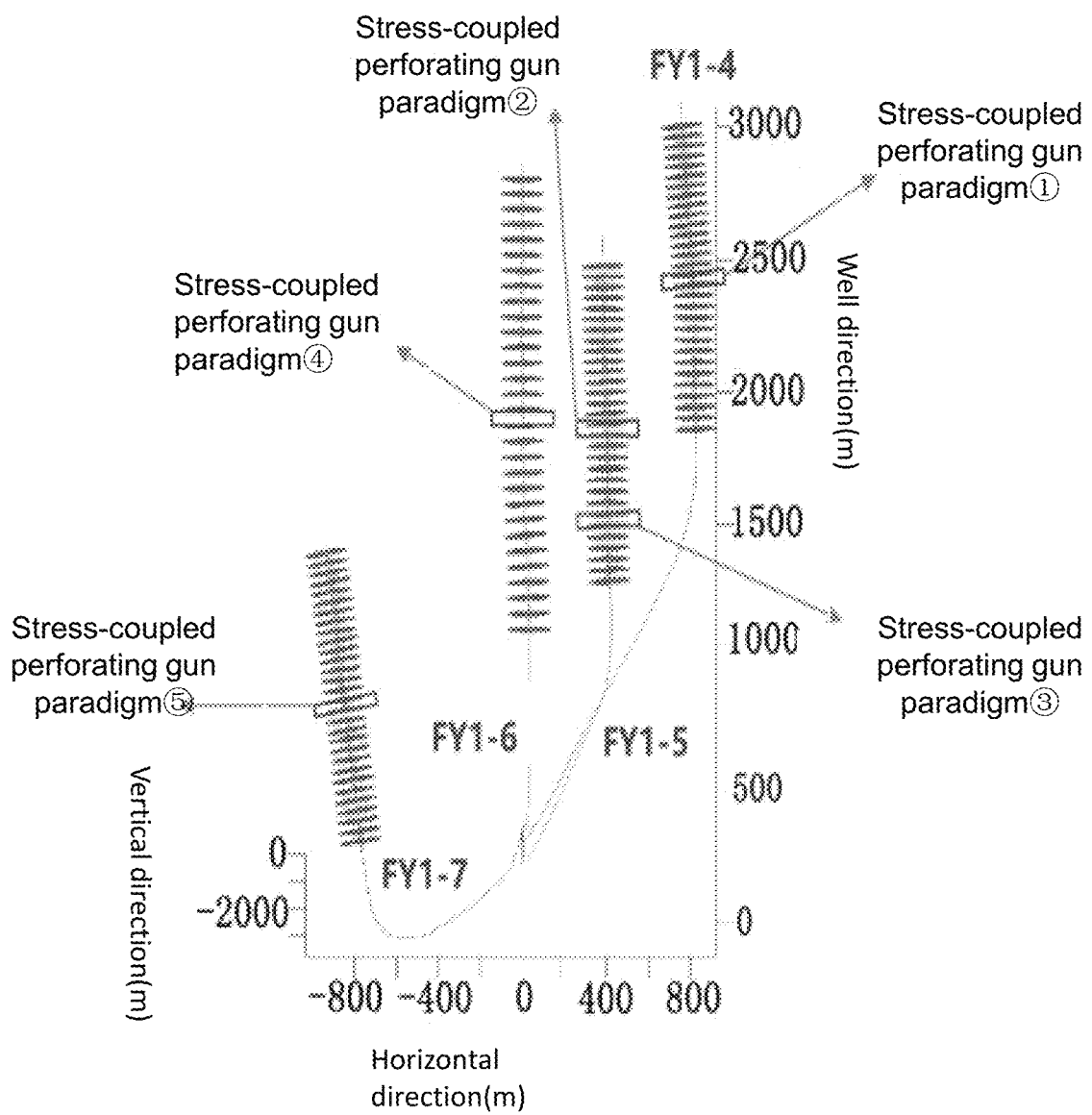
FIG. 10 is a brief schematic diagram illustrating a design parameter of a segmented stress-coupled perforating gun for an HF well plant according to some embodiments of the present disclosure.
Figure 11:
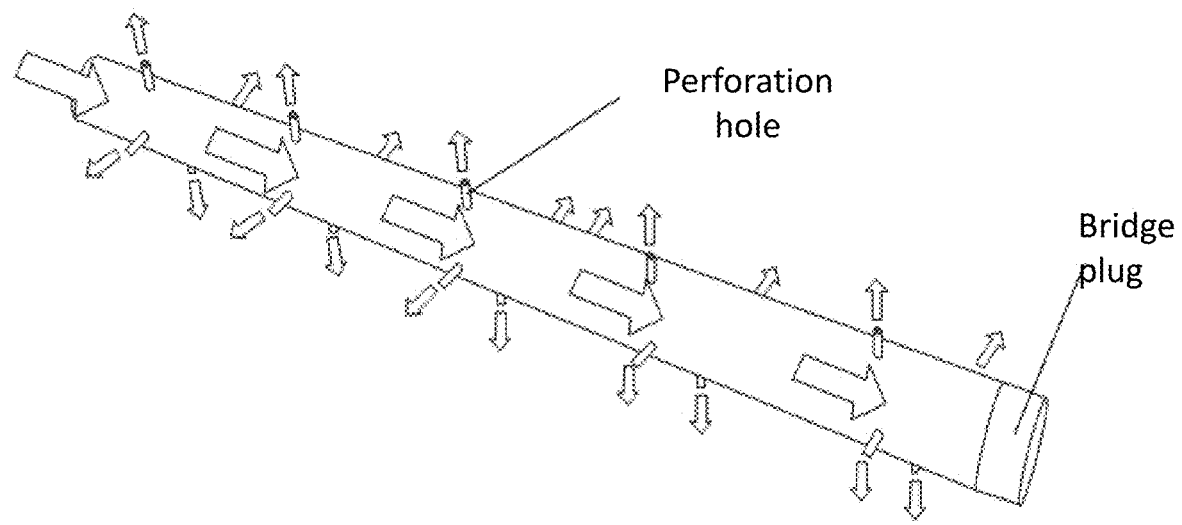
FIG. 11 is an example of the stress-coupled perforating gun of FIG. 9.

Additionally, the embodiment further cites a case of a segmented stress-coupled perforating gun application for a well plant in a non-homogeneous reservoir:

Unlike the ideal homogeneous reservoir, in reality, there may be different degrees of non-homogeneity in a vast majority of reservoirs. To improve the efficiency of the fracturing operation, the fracturing mode, such as an HF test well of the present disclosure, of the well plant may be widely adopted. The well plant refers to a comprehensive facility for drilling, completing, and oil producing, which consists of a series of wells and production facilities that allow for a plurality of wells to be drilled, completed, and produced at the same location. In the HF process, the well plant model refers to an installation of a plurality of horizontal wells at the same location, and the use of a centralized fracturing operation platform to carry out continuous HF operation for the plurality of wells, such as the FY1-4, FY1-5, FY1-6, and FY1-7 in the HF well plant. The 3D coordinates of the trajectories of wells FY-4 to FY-7 are shown in FIG. 9, and furthermore, the design parameter of the HF well plant's segmented stress-coupled perforating gun are shown in FIG. 10 to FIG. 11. In FIG. 11, the design parameters of the stress-coupled perforation cluster of segment 16, well plant well No. 1 are 8 holes of 6 mm.

Figure 12:
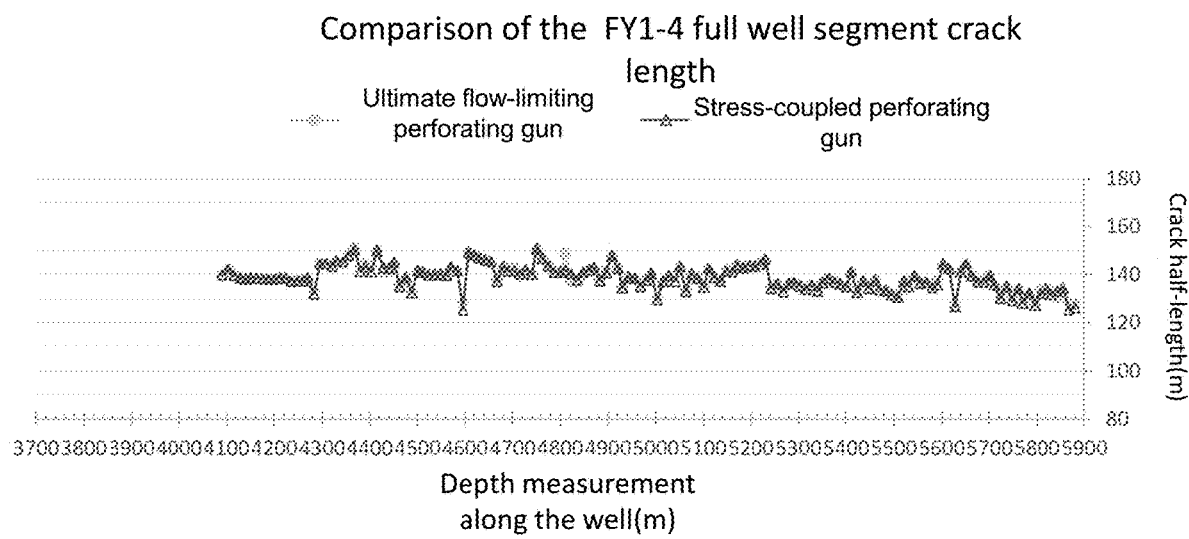
FIG. 12 is a comparison diagram illustrating lengths and areas of ultimate flow-limiting perforating gun and stress-coupled perforating gun in a well FY-1 along a crack by according to some embodiments of the present disclosure.
Figure 13:
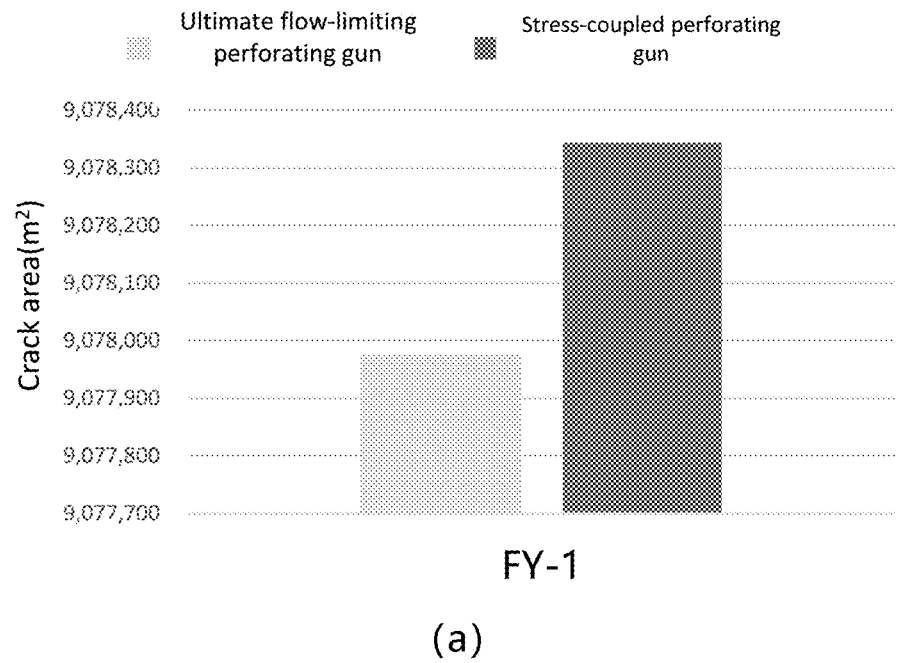
FIG. 13 is a comparison diagram illustrating lengths and areas of a crack of a full well segment of ultimate flow-limiting perforating gun and stress-coupled perforating gun in an FY-1 well according to some embodiments of the present disclosure.
Figure 13:
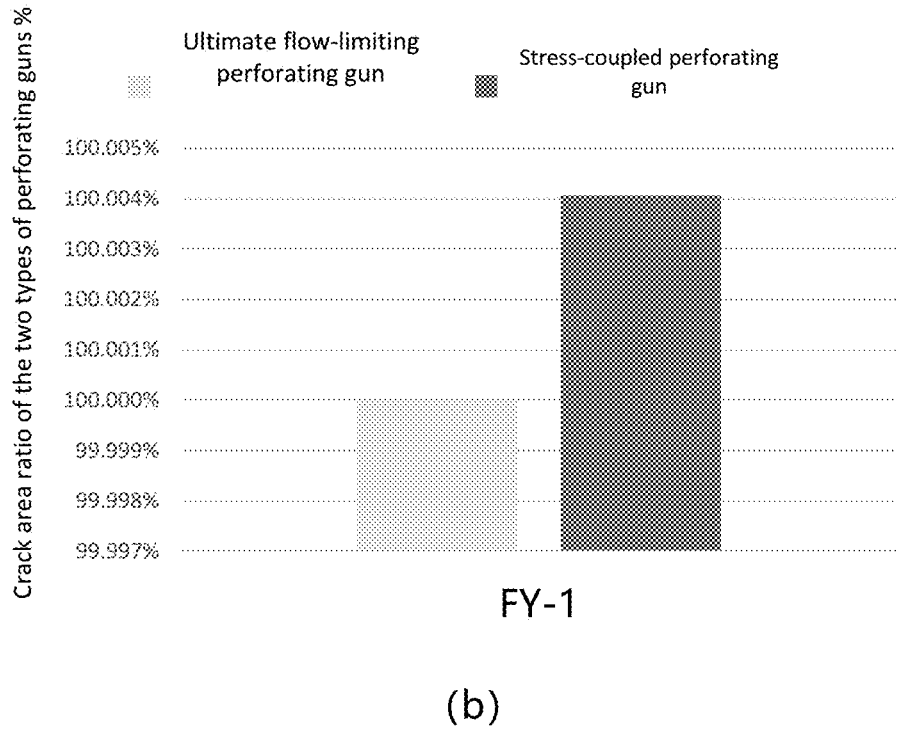
Figure 14:
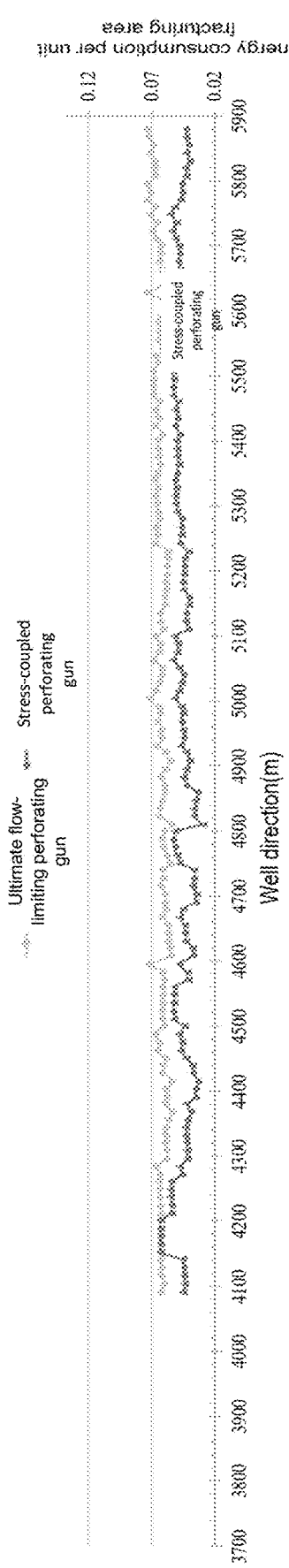
FIG. 14 is a comparison diagram illustrating absolute values and relative values of energy consumptions along a well for a well ultimate flow-limiting perforating gun and a stress coupled perforating gun according to some embodiments of the present disclosure.
Figure 14:
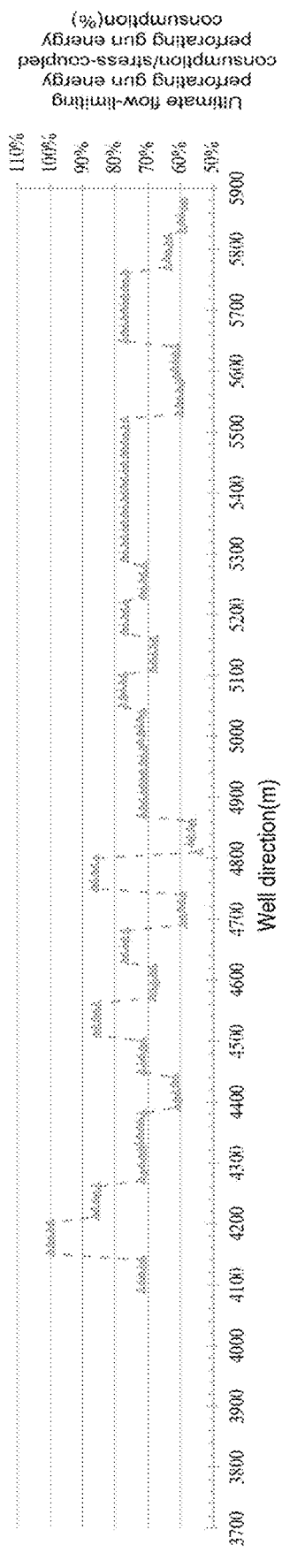
Figure 15:
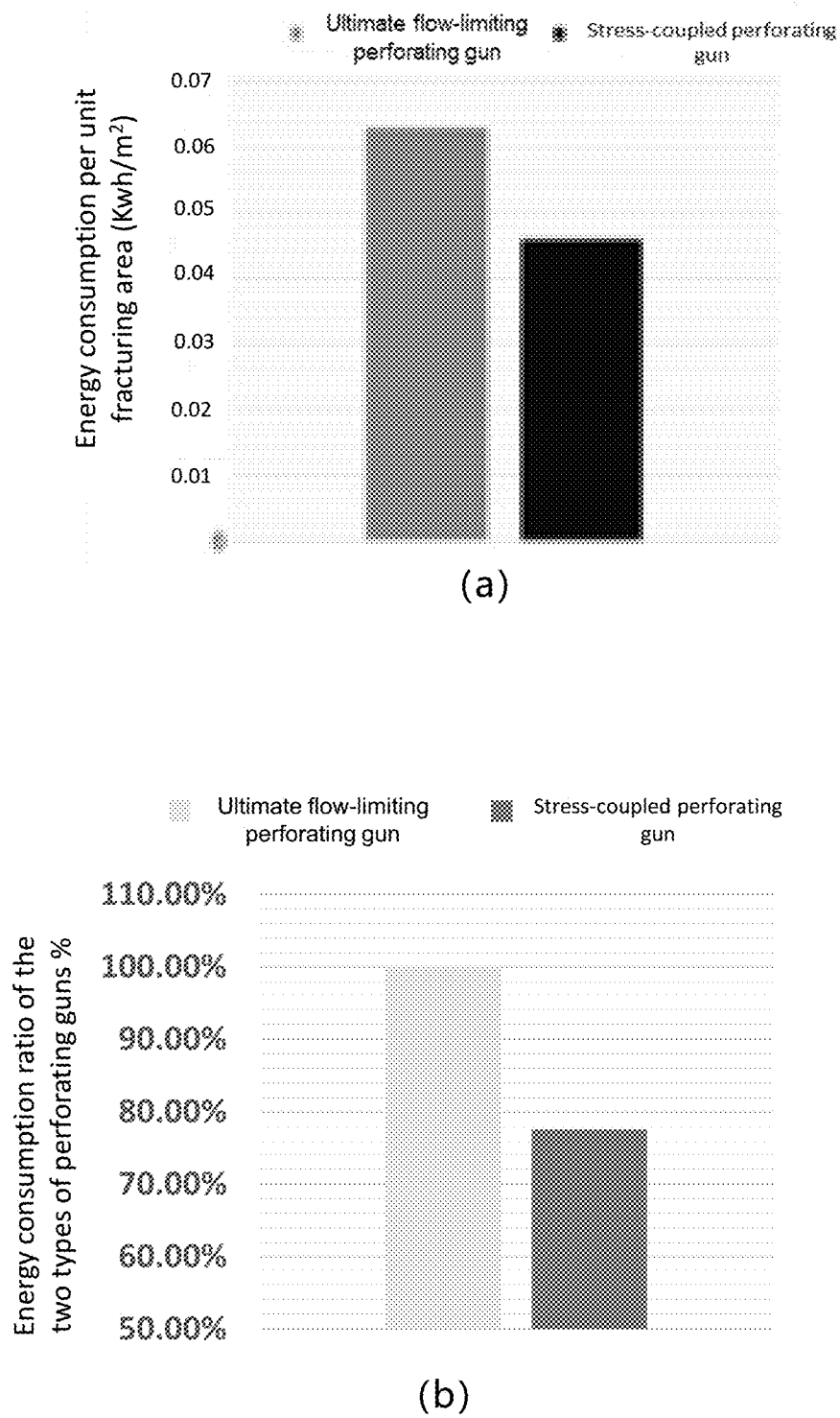
FIG. 15 is a comparison diagram illustrating absolute values and relative values of energy consumptions along an FY-1 well for a well ultimate flow-limiting perforating gun and a stress coupled perforating gun according to some embodiments of the present disclosure.

It should be noted that (a) in FIG. 13 is a comparison diagram illustrating lengths of the crack of the full well segment of the FY-1 well by ultimate flow-limiting perforating gun and stress-coupled perforating gun, and (b) in FIG. 13 is a comparison diagram illustrating areas of the crack of the full well segment of an FY-1 well by ultimate flow-limiting perforating gun and stress-coupled perforating gun. (a) in FIG. 15 is a comparison diagram illustrating absolute values of energy consumptions along the FY-1 well for the ultimate flow-limiting perforating gun and the stress coupled perforating gun, and (b) in FIG. 15 is a comparison diagram illustrating relative values of energy consumptions along the FY-1 well for the ultimate flow-limiting perforating gun and the stress coupled perforating gun. In this embodiment, based on the idea of segmented dynamic stress coupling, a crack half-length may be combined with the energy consumption of per unit fracturing area in the case of the same volume of fluid injection. Comparing the scheme of using a segmented stress-coupled perforating gun with that of the ultimate flow-limiting perforating gun, the stress-coupled perforating gun may be comprehensively evaluated. Taking the FY-1 well as an example, it is observed that apart from the crack of the stress-coupled perforating gun appearing to be weakly developed relative to that of the ultimate flow-limiting perforating gun at a measured depth of 4800 m, with a difference of about 10-15 m (the dashed circle in FIG. 12), the difference in crack length within the other segments may not exceed 5 m. Statistically, the total crack area of the stress-coupled perforating gun scheme in HF1-4 well not only slightly exceeds the ultimate flow-limiting perforating gun by 0.004%, but also significantly reduces the energy consumption per unit crack area by an average of 27% compared to the ultimate flow-limiting perforating gun. At 4820 m and 5520 m in the FY-2 well, the scheme with the segmented stress-coupled perforating gun has only a slight disadvantage of 0.35% in the total crack area although the crack length is significantly smaller than that of the ultimate flow-limiting perforating gun, and the total crack area is only 0.35% inferior to that of the ultimate flow-limiting perforating gun, while the energy consumption with the segmented stress-coupled perforating gun is significantly stronger than that with the ultimate flow-limiting perforation gun by 32%. This phenomenon may also be observed in the FY-3 and the FY-4 wells, where the segmented stress-coupled perforating gun achieves up to a 36% reduction in energy consumption with a minimum of less than 0.012% of the total crack area.

The basic concepts have been described above, and it is apparent to those skilled in the art that the foregoing detailed disclosure is intended as an example only and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

Also, the specification uses specific words to describe embodiments of the specification. Such as "an embodiment", "one embodiment", and/or "some embodiments" means a feature, structure, or characteristic associated with at least one embodiment of the present disclosure. Accordingly, it should be emphasized and noted that the "an embodiment" "one embodiment", and/or "some embodiments" referred to two or more times in different locations in the present disclosure do not necessarily refer to the same embodiment. In addition, certain features, structures, or characteristics of one or more embodiments of the present disclosure may be suitably combined.

In addition, unless expressly stated in the claims, the order of the processing elements and sequences, the use of numerical letters, or the use of other names as described in the present disclosure are not intended to qualify the order of the processes and methods of the present disclosure. While some embodiments of the invention that are currently considered useful are discussed in the foregoing disclosure by way of various examples, it should be appreciated that such details serve only illustrative purposes, and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group multiple features together in an individual embodiment, accompanying drawings, or in a description thereof. description thereof. However, this method of disclosure does not imply that more features are required for the objects of the present disclosure than are mentioned in the claims. Rather, claimed subject matter may lie in less than all features of an individual foregoing disclosed embodiment.

Finally, it should be understood that the embodiments described in the present disclosure are used only to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for designing a perforating gun capable of reducing energy consumption, comprising the following steps:

Step S1, recall an initial basic data of a target operation region from a storage module, and construct a perforating gun stress coupling model based on the basic data of the target operation region;

Step S2, select a perforation number of a perforation cluster and a perforation diameter by Monte Carlo randomization, and form an array trial calculation perforation parameter pair;

Step S3, establish an initial iterative flow equation based on the perforating gun stress coupling model, and perform a crack expansion pattern calculation to obtain a crack development pattern, including:

substituting the initial iterative flow equation into an expression for a traction force $T_{C,(i,j,k)}(\rho_{C,(i,j,k)}, \mu_{i,j,k}^C(t), \psi_{i,j,k}(t))$, on the kth crack $F_{i,j,k}$ in the jth segment of the ith well:

$$T_{C,(i,j,k)}(\rho_{C,(i,j,k)}, \mu_{i,j,k}^c(t), \psi_{i,j,k}(t)) = \left(\frac{E'^2 \mu_{i,j,k}^c(t)}{t}\right)^{\frac{1}{3}} \left\{ A\left[\omega - \frac{2}{3(1-\rho_{i,j,k})^{\frac{1}{3}}}\right] - B\left(\ln\frac{\rho_{i,j,k}}{2} + 1\right) + \psi_{i,j,k}(t) \right\} - \sum_n^{n,n \neq i} \sum_m^{m,m \neq j} \sum_l^{l,l \neq i} \sigma_{n,m,l}(\zeta_{C,(n,m,l)}, \rho_{C,(n,m,l)}, t) \quad (21)$$

where, $\rho_{C,(i,j,k)}$ denotes a ratio of a distance r between a point C on the crack $F_{i,j,k}$ and a center of the crack $F_{i,j,k}$ to a radius of the crack $R_{i,j,k}$; $\mu_{i,j,k}^C(t)$ denotes a complex fluid viscosity in the crack $F_{i,j,k}$; n denotes the nth well; m denotes the mth segment; l denotes the lth perforation cluster; A and B denote a constant, respectively; $\sigma_{(i,j,k)}$ denotes an interaction stress generated by the crack $F_{i,j,k}$; $\zeta_{C,(n,m,l)}$ denotes a ratio of a projected perpendicular distance $D_{C,(n,m,l)}$ between the point C on a fracture surface of the crack $F_{n,m,l}$ and the fracture surface of the crack $F_{n,m,l}$ to a crack radius $R_{i,j,k}$; $\rho_{C,(n,m,l)}$ denotes a ratio of the distance $L_{C,(n,m,l)}$ between the point C and the center of crack $F_{n,m,l}$ in an expansion direction of crack $F_{i,j,k}$ to the crack radius $R_{i,j,k}$; and $\Psi_{i,j,k}(t)$ denotes a contribution of a rock toughness to the traction force, which is expressed as:

$$\psi_{i,j,k}(t) = \left(\frac{K_I}{2\sqrt{\frac{R_{i,j,k}(t)}{\pi}}} + \int_0^1 \frac{\sum_{j=1}^{N,j \neq i} \sigma_{C,(i,j,k)} \rho_{C,(i,j,k)}}{\sqrt{1 - \rho_{C,(i,j,k)}^2}} d\rho_{C,(i,j,k)}\right) \bigg/ \left(\frac{E'^2 \mu_{i,j,k}^c(t)}{t}\right)^{\frac{1}{3}} \quad (22)$$

where, t denotes a time consumed by injected fluid; E' denotes a parameter of Young's modulus combined with Poisson's ratio v; E' is given by the following equation:

$$E' = \frac{E}{(1-v^2)} \quad (23)$$

a crack opening and a crack radius considering a dynamic stress effect of well group fracturing derived from Eq. (21) are expressed as:

$$R_{i,j,k}(t) = \gamma_{i,j,k}(t)\left[\left(\frac{E't}{\mu_{i,j,k}^c(t)}\right)^{1/3}\int_0^t Q_{i,j,k}(t)dt\right]^{1/3}, \quad (24)$$

$$w_{i,j,k}(r,t) = \frac{8R_{i,j,k}(t)}{\pi E'}\int_{\rho_i}^1 \frac{s}{\sqrt{s^2-\rho_i^2}}\int_0^1 \frac{xT_{i,j,k}(\rho_{i,j,k}\mu_{i,j,k}^c(t),\psi_{i,j,k}(t))}{\sqrt{1-x^2}}dxds \quad (25)$$

$$\rho_{i,j,k} = r/R_{i,j,k}(t)$$

where, $R_{i,j,k}$ denotes the radius of the crack $F_{i,j,k}$; $\gamma_{i,j,k}(t)$ denotes a radius modification factor of the crack $F_{i,j,k}$; $Q_{i,j,k}(t)$ denotes a fluid displacement entering the crack $F_{i,j,k}$; $w_{i,j,k}(r,t)$ denotes the opening of the crack $F_{i,j,k}$; x and s denote a radial integration factors in the first and second layer integrals, respectively; $\rho_{i,j,k}$ denotes the ratio of a distance between a point on the crack $F_{i,j,k}$ and the center of the crack to $R_{i,j,k}(t)$; and $T_{i,j,k}$ denotes the traction force on the crack $F_{i,j,k}$;

the crack development pattern under any perforation parameter is obtained according to Eq. (24) and Eq. (25);

Step S4, obtain a real-time stress distribution state by stress calculation Eq. (14) based on the crack development pattern;

Step S5, calculate a power consumed by the crack to overcome the stress effect of a fractured crack; at the same time, calculate a power loss when a fluid passes through a perforation hole of a perforation based on a trial calculation perforation parameter;

Step S6, obtain an instantaneous flow for each perforation cluster for the iteration by performing a power balance equation settlement in Newton's method and return to step S3;

Step S7, repeat steps S3 to S6 until the instantaneous flow for each perforation cluster is less than a preset threshold, and proceed to step S8;

Step S8, obtain a total pumping time T required for the flow of each perforation cluster to be less than the preset threshold, and accumulate to obtain a combined crack area in an individual segment;

Step S9, repeat steps S3 to S8 until the crack development patterns of all segments of an individual well and a corresponding total energy consumption are obtained, and obtain the energy consumed on a per unit fracturing area for a trial calculation perforation parameter pair; and Step S10, traverse any trial calculation perforation parameter pair, select a perforation parameter combination that achieves a maximum fracture fracturing area with a minimum energy consumption as a target perforation parameter combination, and generate a first control instruction and send the first control instruction to an operation module to complete an optimization of the stress-coupled perforating gun.

2. The method of claim 1, wherein in the step S1, the geological parameter and the engineering parameter include: a formation filtration loss factor CL, the Young's modulus E', the Poisson's ratio v, a fluid viscosity μ, a rock fracture toughness $K_1$, a total injection flow $Q_0$, a total pumping time T, a spacing $h_i$ between each perforation cluster within a segment, a segment length Z, and a time step Δt.

3. The method of claim 1, wherein in the step S2, the perforation number is in a range of 5-20; and the perforation diameter is in a range of 0.006 m-0.015 m.

4. The method of claim 1, wherein in the step S3, the initial iterative flow equation is expressed as $Q_i(t_0)=Q_0/N$; wherein $t_0$ denotes an initial time; N denotes a total number of perforation clusters in individual segment.

5. The method of claim 1, wherein in the step S4, a real-time stress distribution state is obtained by a stress calculation equation (14) based on the crack development pattern, wherein the stress calculation equation is expressed as follows:

$$\sigma_C = \Sigma_i^N \Sigma_j^{n_i} \Sigma_k^{m_j} \sigma_{C,(i,j,k)}(\zeta_{C,(i,j,k)}, \rho_{C,(i,j,k)}, t) \quad (14)$$

where, $\sigma_{C,(i,j,k)}$ denotes a normal stress component imposed by the kth crack $F_{i,j,k}$ within the jth segment of the ith well on any point C in the space; $\zeta_{C,(i,j,k)}$ denotes a ratio of a projected perpendicular distance $D_{(i,j,k)}$ between the fracture surface of the kth crack $F_{i,j,k}$ within the jth segment of the ith well and the any point C in the space to the crack radius $R_{i,j,k}$; $\rho_{C(i,j,k)}$ denotes the ratio of the distance $L_{C,(i,j,k)}$ between any point C in the space and the center of the kth crack $F_{i,j,k}$ within the jth segment of the ith well along the direction of crack extension at the crack fracture surface to the crack radius $R_{i,j,k}$; $n_i$ denotes a number of fractured segments in the ith well; and $m_j$ denotes a total number of cracks fractured simultaneously in the jth segment.

6. The method of claim 5, wherein in the step S5, the power $p_{fo}Q_{i,j,k}$ consumed by the crack to overcome the stress effect of the stress of the fractured crack is calculated by a equation:

$$P_{fo}Q_{i,j,k} = W_f + D_f \quad (17)$$

where, $W_f$ denotes the power consumed by the fluid to act on a solid; and $D_f$ denotes an input power consumed by a flow of fluid.

7. The method of claim 6, wherein in the step S5, a power loss $P_{perf(i)}$ is calculated when the fluid passes through the perforation hole of the perforation based on a trial calculation perforation parameter, the expression for $P_{perf(i)}$ is:

$$P_{perf(i)} = \left(\frac{\alpha\rho}{n_i^2 D_{p(i)}^4 C^2}\right)Q_i(t)^3 \quad (20)$$

where, α denotes a constant factor; ρ denotes a density of fluid injected into a reservoir; $D_{p(i)}$ denotes the perforation diameter of the ith cluster; C denotes that a perforation tunnel itself has a shape factor; $Q_i(t)$ denotes a volume flow through the ith perforation cluster at time t; $n_i$ denotes a perforation hole number of the ith perforation cluster.

8. The method of claim 7, wherein in the step S5, the power loss $P_{perf(i)}$ as the fluid passes through the perforation hole is substituted into Eq. (14).

9. The method of claim 8, wherein in the step S10, evaluation and optimization is carried out using a equation (28), which is expressed as:

$$E_f = [\Sigma_{k=1}^N \int_0^T P_{fo(k)}(t)Q_{0(k)}dt]/\Sigma_{k=1}^N A_k \quad (28)$$

where, $p_{fo(k)}(t)$ denotes a flow pressure of the fluid inside the crack; $Q_{0(k)}$ denotes a total pumping flow corresponding to segment k; $A_k$ denotes a total area of all the cracks within the segment k; and $E_f$ denotes an amount of energy consumed for fracturing fractures in per unit area.

\* \* \* \* \*

UNITED STATES PATENT AND TRADEMARK OFFICE
CERTIFICATE OF CORRECTION

| | | |
|---|---|---|
| PATENT NO. | : 12,056,422 B1 | Page 1 of 1 |
| APPLICATION NO. | : 18/437262 | |
| DATED | : August 6, 2024 | |
| INVENTOR(S) | : Cheng Cheng et al. | |

It is certified that error appears in the above-identified patent and that said Letters Patent is hereby corrected as shown below:

On the Title Page

Item (72) Inventors, please delete the following name and residence:
"ANDREW BUNGER, Pittsburgh, PA (US)"

Signed and Sealed this
Twenty-first Day of October, 2025

John A. Squires
*Director of the United States Patent and Trademark Office*